(12) United States Patent
Anno et al.

(10) Patent No.: US 8,323,551 B2
(45) Date of Patent: Dec. 4, 2012

(54) POLYETHYLENE TEREPHTHALATE RESINS AND PROCESS FOR PRODUCING POLYESTER RESIN MOLDINGS

(75) Inventors: Syuji Anno, Yokkaichi (JP); Yoshihiro Fujimori, Yokkaichi (JP); Jouji Akiyama, Yokkaichi (JP); Katsuji Tanaka, Yokkaichi (JP); Tetsuya Sugita, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1354 days.

(21) Appl. No.: 11/430,282

(22) Filed: May 9, 2006

(65) Prior Publication Data
US 2006/0264599 A1 Nov. 23, 2006

Related U.S. Application Data

(63) Continuation of application No. PCT/JP2004/016683, filed on Nov. 10, 2004.

(30) Foreign Application Priority Data

Nov. 11, 2003 (JP) ................. 2003-380665

(51) Int. Cl.
*B29B 7/00* (2006.01)
*C08F 283/00* (2006.01)

(52) U.S. Cl. ................... 264/328.17; 528/272; 525/418; 525/419

(58) Field of Classification Search .................. 528/272; 525/418, 419; 264/328.17
See application file for complete search history.

(56) References Cited

U.S. PATENT DOCUMENTS

| | | | |
|---|---|---|---|
| 5,444,144 A | 8/1995 | Tanaka et al. | |
| 6,346,070 B1 | 2/2002 | Ohmatsuzawa et al. | |
| 6,500,915 B1 | 12/2002 | Fujimori et al. | |
| 2002/0165326 A1 * | 11/2002 | Takashima et al. | 525/425 |
| 2003/0109667 A1 | 6/2003 | Fujimori et al. | |
| 2004/0044173 A1 | 3/2004 | Fujimori et al. | |
| 2005/0131202 A1 | 6/2005 | Fujimori et al. | |
| 2006/0009612 A1 | 1/2006 | Fujimori et al. | |
| 2006/0084782 A1 | 4/2006 | Fujimori et al. | |
| 2006/0084784 A1 | 4/2006 | Nimura et al. | |
| 2006/0229429 A1 | 10/2006 | Fujimori et al. | |
| 2007/0155947 A1 | 7/2007 | Fujimori et al. | |
| 2008/0108780 A1 | 5/2008 | Fujimori et al. | |

FOREIGN PATENT DOCUMENTS

| | | |
|---|---|---|
| EP | 1 013 692 | 6/2000 |
| EP | 1 013 692 A2 | 6/2000 |
| JP | 7-205257 | 8/1995 |
| JP | 07 205257 A | 8/1995 |
| JP | 2001-200044 | 7/2001 |
| JP | 2002-308974 | 10/2002 |

* cited by examiner

*Primary Examiner* — Ling Choi
*Assistant Examiner* — Gennadiy Mesh
(74) *Attorney, Agent, or Firm* — Nixon & Vanderhye P.C.

(57) ABSTRACT

Provided in this invention are polyethylene terephthalate resins which can suppress the formation of acetaldehyde as a by-product in melt molding of the resins and can provide the molded products reduced in acetaldehyde content.

A polyethylene terephthalate resin which has an intrinsic viscosity $[\eta_2]$ of not less than 0.70 dl/g and not more than 1.50 dl/g and an acetaldehyde content $[AA_0$ (ppm by weight)] of not more than 10 ppm by weight, and has such properties that the acetaldehyde content $[AA_1$ (ppm by weight)] of the molded product obtained by injection molding the resin at 280° C. with its moisture content adjusted to 30±20 ppm by weight and the acetaldehyde content $[AA_2$ (ppm by weight)] of the molded product obtained by injection molding the resin at 280° C. with its moisture content adjusted to 120±20 ppm by weight satisfy the following formula (1):

$$[(AA_1-AA_2)/AA_1]\times 100 \geqq 30 \qquad (1).$$

3 Claims, 1 Drawing Sheet

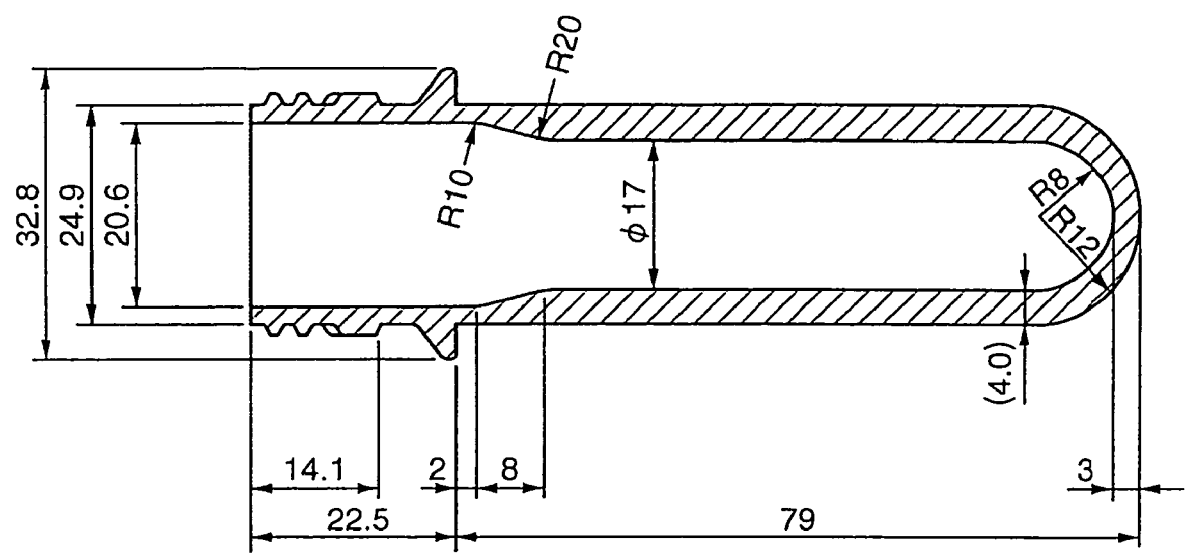

POLYETHYLENE TEREPHTHALATE RESINS AND PROCESS FOR PRODUCING POLYESTER RESIN MOLDINGS

This application is a continuation of international application PCT/JP2004/016683 filed 10 Nov. 2004, and claims benefit of JP 2003-380665, filed 11 Nov. 2003, the entire contents of each of which are hereby incorporated by reference.

TECHNICAL FIELD

The present invention relates to polyethylene terephthalate resins and a process for producing polyester resin moldings. More particularly, it relates to the polyethylene terephthalate resins which can specifically suppress the formation of by-product acetaldehyde in course of melt molding and can provide the molded products reduced in acetaldehyde content, a process for producing the molded products specifically showing such characteristics, and a process for producing polyester resin moldings.

BACKGROUND ART

Since polyethylene terephthalate resins have excellent mechanical strength, chemical stability, gas barrier properties, hygienic properties, plus relatively low cost and light weight, they have been used for the bottles for various types of drinks, and the increase of their production in recent years is phenomenal. The bottles made of these polyethylene terephthalate resins are produced, for instance, by a process which comprises injection molding a bottomed tubular preform, reheating this preform to soften it, and subjecting it to drawing blow molding. This process involves the problem that acetaldehyde is formed as a by-product in the molten resin during injection molding of the preform, and in use of the moldings as bottles, the by-product acetaldehyde may get into the contents of the bottles to affect their original flavor.

As a solution to the above problem, there have been proposed, for instance, a method in which the moisture content in the polyethylene terephthalate resin is adjusted to 60 to 500 ppm by weight before it is subjected to melt molding (see, for instance, Patent Document 1), and a method in which, as an improvement from the aspect of polycondensation reaction catalyst, the polyethylene terephthalate resin polycondensed in the presence of a polycondensation reaction catalyst is brought into contact with a phosphorus-containing solution for treatment therewith, the said polycondensation reaction catalyst comprising a titanium compound and a compound of a metal element such as magnesium in a specific ratio (see, for instance, Patent Document 2). There is also known a polyethylene terephthalate resin producing process in which, in order to suppress the formation of acetaldehyde as a by-product during the molding operation, the starting material is polycondensed in the presence of both a polycondensation reaction catalyst and a phosphorus compound in a specific ratio, the said polycondensation reaction catalyst comprising a titanium compound and a compound of a metal element such as magnesium in a specific ratio (see, for instance, Patent Document 3).

In the method described in Patent Document 1, however, the suppressive effect against the formation of by-product acetaldehyde during the melt molding operation is not necessarily satisfactory, and further, when the molding operation is continued for a long time, the moisture content in the resin may change to cause a variation of acetaldehyde content in the moldings, resulting in a reduction of yield of the products with an acetaldehyde content in the acceptable range, so that means for preventing the drop of yield has been sought. The methods described in Patent Document 2 and Patent Document 3 are also unable to provide a satisfactory inhibitory effect against the formation of acetaldedye in the molding operation and fall short of meeting the market demand. Thus, the development of techniques enabling further suppression of the formation of by-product acetaldehyde in the production of polyethylene terephthalate resin moldings has been desired.

Patent document 1: Japanese Patent Application Laid-Open (KOKAI) No. 7-205257
Patent Document 2: Japanese Patent Application Laid-Open (KOKAI) No. 2001-81161
Patent Document 3: Japanese Patent Application Laid-Open (KOKAI) No. 2002-226563

DISCLOSURE OF THE INVENTION

Problem to be Solved by the Invention

The present invention has been made in view of the above circumstances, and an object of the invention is to provide the polyethylene terephthalate resins which form only a minimized amount of acetaldehyde as a by-product in the melt molding operation to realize a reduction of acetaldehyde content in the molded products of these resins, and a process for producing the moldings which specifically show the above-said characteristics. Another object of the present invention is to provide a process for producing the polyester resin moldings with which it is possible to control the moisture content of the polyester resin supplied to the melt molding operation with stability for a long period of time.

Means for Solving the Problem

The present invention comprises a group of inventions related to each other, the essential points of the respective inventions being as described below.

In the first aspect of the present invention, there is provided a polyethylene terephthalate resin which has an intrinsic viscosity [$\eta_2$] of not less than 0.70 dl/g and not more than 1.50 dl/g and an acetaldehyde content ($AA_0$ (ppm by weight)) of not more than 10 ppm by weight, and has such properties that the acetaldehyde content [$AA_1$ (ppm by weight)] of the molded product obtained by injection molding the resin at 280° C. with its moisture content adjusted to 30±20 ppm by weight and the acetaldehyde content [$AA_2$ (ppm by weight)] of the molded product obtained by injection molding the resin at 280° C. with its moisture content adjusted to 120±20 ppm by weight satisfy the following formula (1):

$$[(AA_1 - AA_2)/AA_1] \times 100 \geq 30 \qquad (1)$$

In the second aspect of the present invention, there is provided a process for producing polyethylene terephthalate resin moldings which process comprises using a polyethylene terephthalate resin as starting material, melt molding it with its moisture content adjusted to be not less than 60 ppm by weight and not more than 300 ppm by weight.

In the third aspect of the present invention, there is provided a process for producing polyester resin moldings which process uses, as starting material, a polyester resin mixture (c) with its moisture content adjusted to 60 to 300 ppm by weight, said mixture comprising, in a ratio of (a)/(b)>1, a polyester resin (a) having a moisture content of less than 60 ppm by weight and a thermoplastic resin (b) other than the polyester resin (a) and having a moisture content of not less than 60 ppm by weight.

In the fourth aspect of the present invention, there is provided a process for producing polyester resin moldings using an injection or extrusion molding machine, which process comprises using a polyester resin (a) having a moisture content of below 60 ppm by weight as starting material, and adding water and/or a liquid containing water to the polyester resin (a) at a point between the material charging hopper attached to the molding machine and the material feeding section of the screw in the molding machine, in which the ratio of water added to the weight of polyester resin (a) supplied to the molding machine is adjusted to be not less than 30 ppm by weight and not more than 2,000 ppm by weight.

Effect of the Invention

The said objects can be achieved according to the present invention. The polyethylene terephthalate resins of the present invention are suited for use as a starting resin for molding bottles by, for instance, blow molding in which the preform obtained by injection molding is biaxially drawn. The moldings can be conveniently used as, for instance, containers for soft drinks, alcoholic drinks, liquid seasonings such as soy sauce, sauce, mirin (sweet sake used for seasoning), dressings, etc., or after heat setting, they may be used as containers for such drinks as fruit juice, vitamin drinks, flavored tea, mineral water, etc.

BRIEF DESCRIPTION OF THE DRAWING

FIG. 1 is a vertical sectional view of a polyethylene terephthalate resin preform molded in the Examples of the present invention.

BEST MODE FOR CARRYING OUT THE INVENTION

The present invention will be described in detail below, but it should be understood that the following descriptions of the structural factors are exemplary of the embodiments of the present invention, and the concept of the present invention is not limited to the disclosures given below.

First, the polyethylene terephthalate resins according to the first aspect of the present invention are explained.

The polyethylene terephthalate resins according to the present invention are produced basically from a process comprising a material mixing step in which a dicarboxylic acid (or its ester forming derivative) mainly comprising terephthalic acid and a diol mainly comprising ethylene glycol are mixed, if necessary with a copolymerization component, to form a slurry of the said materials, an esterification step (or ester exchange step) in which the said slurry of materials is transferred to an esterification reactor (or ester exchange reactor) to carry out an esterification reaction (or ester exchange reaction), a melt polycondensation step in which the obtained low-molecular weight substance is transferred to a polycondensation reactor to conduct a melt polycondensation reaction, and optionally a solid-phase polycondensation step in which a solid-phase polycondensation reaction is carried out as required. Particularly the polyethylene terephthalate resins of the present invention can be produced advantageously by adopting the method involving an esterification reaction using a dicarboxylic acid as a starting material.

In the polyethylene terephthalate resins of the present invention, the ratio of the terephthalic acid to the whole dicarboxylic acid moiety is usually not less than 96 mol %, preferably not less than 98.5 mol %, and the ratio of ethylene glycol to the whole diol moiety is usually not less than 96 mol %, preferably not less than 97 mol %. If the ratios of terephthalic acid and ethylene glycol are below the above-defined ranges, orientation crystallization of the molecular chains by strecthing in the molding operation tends to become unsatisfactory to adversely affect the properties (such as mechanical strength, heat resistance and gas barrier properties) of the molded products. The content of the copolymerization material other than terephthalic acid and ethylene glycol, though variable depending on the purpose of copolymerization, is usually not more than 6 mol %, preferably 1.5 to 4.5 mol %.

Examples of the dicarboxylic acids usable for the said reaction include aromatic dicarboxylic acids such as terephthalic acid, phthalic acid, isophthalic acid, dibromoisophthalic acid, sulfoisophthalic acid, phenylenedioxydicarboxylic acid, 4,4'-diphenyldicarboxylic acid, 4,4'-diphenyl ether dicarboxylic acid, 4,4'-diphenyl ketone dicarboxylic acid, 4,4'-diphenoxyethanedicarboxylic acid, 4,4'-diphenyl sulfone dicarboxylic acid, and 2,6-naphthalenedicarboxylic acid; alicyclic dicarboxylic acids such as hexahydroterephthalic acid and hexahydroisophthalic acid; and aliphatic dicarboxylic acids such as succinic acid, glutaric acid, adipic acid, pimelic acid, suberic acid, azelaic acid, sebacic acid, undecadicarboxylic acid and dodecadicarboxylic acid. As examples of the said ester forming derivatives, the alkyl esters with an alkyl group carbon number of about 1 to 4 (such as dimethyl terephthalate and dimethyl 2,6-naphthalenedicarboxylate) and the halides of dicarboxylic acids can be cited. Of these substances, aromatic dicarboxylic acids and their alkyl esters are preferred, in which terephthalic acid, isophthalic acid, 2,6-naphthalenedicarboxylic acid and their methyl esters are more preferred, with terephthalic acid being especially preferred.

As the diol other than ethylene glycol, it is possible to use diethylene glycol which is formed as a by-product in the reaction system. The ratio of diethylene glycol, including that which is added from the outside of the reaction system as a copolymerization component, to the whole diol moiety is usually not more than 3.0 mol %, preferably not more than 2.5 mol %, more preferably not more than 2.0 mol %. If the ratio of diethylene glycol component exceeds the above-defined range, there may be problems to cause deterioration of properties such as heat resistance and gas barrier properties of the molded products or to make it difficult to reduce the acetaldehyde content in the molded products.

As the diols other than those mentioned above, there can be cited, for instance, aliphatic diols such as trimethylene glycol, tetramethylene glycol, pentamethylene glycol, hexamethylene glycol, octamethylene glycol, decamethylene glycol, neopentyl glycol, 2-ethyl-2-butyl-1,3-propanediol, polyethylene glycol and polytetramethylene ether glycol; alicyclic diols such as 1,2-cyclohexanediol, 1,4-cyclohexanediol, 1,1-cyclohexanedimethylol, 1,4-cyclohexanedimethylol and 2,5-norbornanedimethylol; aromatic diols such as xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone and bis(4-β-hydroxyethoxyphenyl)sulfonic acid; ethylene oxide or propylene oxide adducts of 2,2-bis(4'-hydroxyphenyl)propane.

As the copolymerization component, hydroxycarboxylic acids such as glycolic acid, p-hydroxybenzoic acid and p-β-hydroxyethoxybenzoic acid can be used. It is also possible to use monofunctional substances such as alkoxycarboxylic acid, stearyl alcohol, heneicosanol, octacosanol, benzyl alcohol, stearic acid, behenic acid, benzoic acid, t-butylbenzoic acid and benzoylbenzoic acid, and polyfunctional (tri- or higher-order functional) substances such as tricarballylic acid, trimellitic acid, trimesic acid, pyromellitic acid, naphthalene-tetracarboxylic acid, gallic acid, trimethylolethane, trimethylolpropane, glycerol, pentaerythritol and sugar esters.

A process for producing a polyethylene terephthalate resin according to the present invention is described below by taking up the instance where the esterification reaction is carried out by using a dicarboxylic acid as a starting material.

Preparation of the slurry of materials in the material mixing step can be made, for example, by supplying the materials to a slurry preparation tank and mixing them with stirring therein. The molar ratio of the diol moiety to the dicarboxylic acid moiety in the mixture is usually from 1.00 to 2.00, preferably from 1.03 to 1.70.

The esterification step is conducted usually with stirring using a single or plural esterification reactors. In case of using a single esterification reactor, the reaction is carried out at a temperature of usually 240 to 280° C., under a pressure relative to the atmospheric pressure of usually 0 to 400 kPa (0 to 4 kg/cm$^2$G) for a period of usually 1 to 10 hours. In case of using plural esterification reactors, the reaction temperature is set at usually 240 to 270° C., preferably 245 to 265° C., and the pressure relative to the atmospheric pressure is set at usually 5 to 300 kPa (0.05 to 3 kg/cm$^2$G), preferably 10 to 200 kPa (0.1 to 2 kg/cm$^2$G). The reaction temperature at the final stage of the reaction is set at usually 250 to 280° C., preferably 255 to 275° C., and the pressure relative to the atmospheric pressure at the final stage is set at usually 0 to 150 kPa (0 to 1.5 kg/cm$^2$G), preferably 0 to 130 kPa (0 to 1.3 kg/cm$^2$G).

The average esterification rate (ratio of those of the carboxyl groups in the starting dicarboxylic acid which were reacted with the diol moiety and esterified) of the esterification reaction product obtained from the esterification step is usually not less than 95%. The number-average polymerization degree of the esterification reaction product (low-molecular weight polyester) is usually 3.0 to 10.0. The number-average polymerization degree in the case where the melt polycondensation operation is continuous is preferably 4.0 to 8.0, more preferably 5.0 to 7.0. In the case where the melt polycondensation operation is batchwise, the number-average polymerization degree is preferably 5.0 to 9.0, more preferably 6.0 to 8.0. With the esterification rate and the number-average polymerization degree being controlled to stay in the above-defined ranges, it is possible to conduct supplemental addition of ethylene glycol, to be discussed later, under a relatively low-temperature and low-pressure condition, to realize a decrease of terminal carboxyl groups in the polyethylene terephthalate resin of the present invention and to reduce the amount of diethylene glycol formed as a by-product.

In case of using plural esterification reactors, the average esterification rate of the low-molecular weight polyester in the esterification reactor positioned immediately before that of the final stage is usually not less than 85%, preferably not less than 88%, more preferably not less than 90%. Satisfying these conditions expedites the reduction of terminal carboxyl groups of the polyethylene terephthalate resin of the present invention. The specified average esterification rate can be achieved by elevating the reaction temperature and pressure in the esterification reactors as much as possible within the above-defined ranges.

In the esterification reaction, a small quantity of a basic compound or the like may be added to control the formation of diethylene glycol at a low level. As such a basic compound, there can be used, for instance, tertiary amines such as trimethylamine, tri-n-butylamine and benzylmethylamine; quaternary ammoniums such as tetraethylammonium hydroxide, tetra-n-butylammonium hydroxide and trimethylbenzylammonium hydroxide; lithium carbonate, sodium carbonate, potassium carbonate, sodium acetate, and the like.

The melt polycondensation step can be carried out either continuously or batchwise using a single or plural polycondensation reactors. The operation is conducted by reducing pressure gradually from normal pressure under heating and stirring while distilling away the produced ethylene glycol. In an example of continuous operation using plural polycondensation reactors, there is used a multi-stage reaction apparatus comprising a perfect mixing type reactor provided with a stirring blade for the first stage and horizontal plug flow type reactors, each being provided with a stirring blade, for the second and third stages.

In the case of batchwise operation using a single polycondensation reactor, the reaction temperature is usually 250 to 290° C., the final absolute pressure reached after gradual reduction from normal pressure is usually 1.3 to 0.013 kPa (10-0.1 Torr), and the reaction time is usually 1 to 20 hours. In the case of continuous operation using plural polycondensation reactors, the reaction temperature in the first-stage polycondensation reactor is usually 250 to 290° C., preferably 260 to 280° C., and the absolute pressure is usually 65 to 1.3 kPa (500-10 Torr), preferably 26 to 2 kPa (200-15 Torr). The reaction temperature at the final stage is usually 265 to 300° C., preferably 270 to 295° C., and the absolute pressure at the final stage is usually 1.3 to 0.013 kPa (10-0.1 Torr), preferably 0.65 to 0.065 kPa (5-0.5 Torr). As the reaction conditions for the middle stage, the conditions intermediate between those for the first and final stages are selected. For instance, in the case of a three-stage reaction apparatus, the reaction temperature at the second stage is usually 265 to 295° C., preferably 270 to 285° C., and the absolute pressure is usually 6.5 to 0.13 kPa (50-1 Torr), preferably 4 to 0.26 kPa (30-2 Torr).

The intrinsic viscosity ($[\eta_1]$) of the polyethylene terephthalate resin obtained from the said melt polycondensation step, as measured at 30° C. using a phenol/tetrachloroethane (1/1 by weight) mixture as solvent, is usually 0.35 to 0.75 dl/g, preferably 0.50 to 0.65 dl/g. When the intrinsic viscosity ($[\eta_1]$) is below the above-defined range, withdrawability of the resin from the polycondensation reactor, to be discussed later, tends to deteriorate, and when the viscosity ($[\eta_1]$) exceeds the above-defined range, it tends to become difficult to reduce the acetaldehyde content in the obtained resin.

The resin obtained from the said melt polycondensation step is usually withdrawn into the form of strand from a withdrawal port provided at the bottom of the reactor, and with cooling or after cooled with water, cut by a cutter into a granular form such as pellets or chips. If necessary, the granular product may be further subjected to a solid-phase polycondensation reaction after the said melt polycondensation step.

The solid-phase polycondensation step comprises (1) heating the granular product in an inert gas (such as nitrogen, carbon dioxide or argon gas) atmosphere under a pressure relative to the atmospheric pressure of usually not more than 100 kPa (1 kg/m$^2$G), preferably not more than 20 kPa (0.2 kg/cm$^2$G), for a period of usually 5 to 30 hours, or (2) heating the granular product under an absolute pressure of usually 6.5 to 0.013 kPa (50-0.1 Torr), preferably 1.3 to 0.065 kPa (10-0.5 Torr), for a period of usually 1 to 20 hours. The heating temperature is usually 190 to 230° C., preferably 195 to 225° C., in either case. This solid-phase polycondensation reaction makes it possible to obtain an even higher polymerization degree while reducing the amount of the by-products such as cyclic trimers and acetaldehyde produced.

In the present invention, prior to the said solid-phase polycondensation reaction, preferably the granular resin surface is crystallized by heating at usually 120 to 200° C., preferably 130 to 190° C., in an inert gas, water vapor, or water vapor-containing inert gas atmosphere for 1 to 4 hours. Especially the heat treatment conducted in a water vapor atmosphere is preferable as it serves for accelerating crystallization of the granular resin and further reducing the acetaldehyde content in the obtained resin.

In producing the polyethylene terephthalate resins according to the first aspect of the present invention, it is important that (1) a compound of at least one element selected from the group consisting of the Group 4A metal elements in the long form of the periodic table and (2) a compound of at least one element selected from the group consisting of the Group 1A metal elements in the long form of the periodic table, the Group 2A metal elements in the long form of the periodic table, aluminum, manganese, iron, cobalt, zinc, gallium and germanium, are added to the esterification reaction product with a rate of esterification of not less than 75% and a number-average polymerization degree of 3.0 to 10.0 at a stage between the esterification step and the melt polycondensation step.

The "number-average polymerization degree" mentioned above is a value determined in the following way. The sample is dissolved in a heavy hydrogenated chloroform/hexafluoroisopropanol (7/3 by weight) mixed solvent to a concentration of 2% by weight, and 20 μl of pyridine-d5 is added thereto. $^1$H-NMR of this solution is measured by a nuclear magnetic resonance meter (JNM-GSX-400 mfd. by Nippon Electron Co., Ltd.) and the respective peaks are assigned on the basis of the obtained results. Then the number of the terminal hydroxyl groups [OH] (mols/ton of sample), the number of the terminal carboxyl groups [COOH] (mols/ton of sample) and the number of the terminal diethylene glycol groups [DEG] (mols/ton of sample) are calculated from the ratios of the integral values of the respective peaks to the integral value of benzene ring protons in the terephthalic acid unit, and with the sum total of the numbers of these terminal groups being counted as the total number of the terminal groups, the number-average polymerization degree is calculated from the following equation:

Number-average polymerization degree $(n)$=1,000,000/{([OH]+[COOH]+[DEG])/2}/192.2

The polyethylene terephthalate resin in a preferred embodiment of the present invention is obtained by using a titanium compound and/or an aluminum compound as the polycondensation reaction catalyst. A titanium compound is preferred as the polycondensation reaction catalyst. In case of using an aluminum compound as the polycondensation reaction catalyst, there may take place a reduction of thermal and/or oxidative stability of the resin and generation of foreign matter or tinting of the resin attributable to aluminum.

Examples of the titanium compounds usable for the above purpose are tetra-n-propyl titanate, tetra-i-propyl titanate, tetra-n-butyl titanate, tetra-n-butyl titanate tetramers, tetra-t-butyl titanate, titanium acetate, titanium oxalate, potassium titanium oxalate, sodium titanium oxalate, potassium titanate, sodium titanate, titanium chloride, and titanium chloride-aluminum chloride mixture. Among them, titanium alkoxides such as tetra-n-propyl titanate, tetra-i-propyl titanate and tetra-n-butyl titanate, titanium oxalate and potassium titanium oxalate are preferred in view of high solubility in organic solvents and water and ease of treatment. The solid titanium compounds insoluble in organic solvents and water are unsuited for use as they tend to form alien matter in the resin.

As the said aluminum compound, there can be used, for example, carboxylates such as aluminum formate, aluminum acetate, basic aluminum acetate, aluminum trichloroacetate, aluminum propionate, aluminum laurate, aluminum stearate, aluminum acrylate, aluminum oxalate, aluminum citrate, aluminum benzoate, aluminum lactate and aluminum salicylate; inorganic acid salts such as aluminum chloride, aluminum hydroxide, aluminum hydroxide chloride chloride, aluminum carbonate, aluminum phosphate and aluminum phosphonate; alkoxides such as aluminum methoxide, aluminum ethoxide, aluminum-n-propoxide, aluminum-iso-propoxide, aluminum-n-butoxide and aluminum-t-butoxide; chelate resin compounds such as aluminum acetylacetate, aluminum acetylacetonate, aluminum ethylacetoacetonate and aluminum ethylacetoacetonate-di-iso-propoxide; organoaluminum compounds such as trimethylaluminum and triethylaluminum; partial hydrolyzates of these compounds, and aluminum oxide. Of these compounds, carboxylates, inorganic acid salts and chelate resin compounds are preferred, in which basic aluminum acetate, aluminum chloride, aluminum hydroxide, aluminum hydroxide chloride chloride and aluminum acetylacetonate are especially preferred.

The polyethylene terephthalate resin in a more preferred embodiment of the present invention can be obtained by using a titanium compound, a magnesium compound and/or a calcium compound as the polycondensation reaction catalyst while using a phosphorus compound as an auxiliary. The preferred combinations of polycondensation reaction catalysts are titanium compound-magnesium compound, titanium compound-calcium compound, and titanium compound-magnesium compound-calcium compound, mentioned in the order of preference.

Examples of the magnesium compounds usable here are magnesium oxide, magnesium hydroxide, magnesium alkoxide, magnesium acetate, magnesium carbonate and their hydrates, of which magnesium acetate and its hydrates are preferred.

Examples of the calcium compounds are calcium oxide, calcium hydroxide, calcium acetate, calcium carbonate, calcium phosphorate and their hydrates, of which calcium acetate and its hydrates are preferred.

As the phosphorus compound, there can be used, for instance, pentavalent phosphorus compounds such as orthophosphoric acid, polyphosphoric acid, and phosphoric esters such as trimethyl phosphate, triethyl phosphate, tri-n-butyl phosphate, trioctyl phosphate, triphenyl phosphate, tricresyl phosphate, tris(triethylene glycol) phosphate, methyl acid phosphate, ethyl acid phosphate, isopropyl acid phosphate, butyl acid phosphate, monobutyl phosphate, dibutyl phosphate, dioctyl phosphate and triethylene glycol acid phosphate; phosphorous acid, hypophosphorous acid, phosphorous esters such as trimethyl phosphite, diethyl phosphite, triethyl phosphite, trisdodecyl phosphite, trisnonyldecyl phosphite, ethyldiethyl phosphonoacetate and triphenyl phosphite; and trivalent phosphorus compounds, e.g., salts of metals such as lithium, sodium and potassium. Of these compounds, phosphoric esters of pentavalent phosphorus compounds are preferred in view of their controllability of polycondensation reaction rate, trimethyl phosphate and ethyl acid phosphate are more preferred, ethyl acid phosphate being especially preferred.

In case where a multi-stage reaction apparatus is provided in the esterification step, addition of each compound in the material mixing step or at a stage between the esterification step and the melt polycondensation step is preferably conducted as follows. A titanium compound and/or an aluminum compound are added to the final-stage esterification reactor in the multi-stage reaction apparatus or to the piping for transfer from the esterification reactor to the melt polycondensation step. A magnesium compound and/or a calcium compound are added to the final-stage esterification reactor. As for the order of addition, preferably a magnesium compound and/or a calcium compound are added prior to the addition of a titanium compound and/or an aluminum compound. The phosphorus compound is preferably added to the slurry preparation tank in the material mixing step or to the first-stage esterification reactor, the former being more preferred.

For producing the polyethylene terephthalate resin according to the first aspect of the present invention, it is important to supplementally add ethylene glycol in an amount which is 4 to 40% by weight of the theoretical yield of the polyethylene terephthalate resin to the esterification reaction product with an esterification rate of not less than 75% and a number-average polymerization degree of 3.0 to 10.0 at a stage between the esterification step and the melt polycondensation step.

The preferred range of number-average polymerization degree of the reaction product in supplemental addition of ethylene glycol is usually 4.0 to 8.0, preferably 5.0 to 7.0 when the melt polycondensation operation is continuous and usually 5.0 to 9.0, preferably 6.0 to 8.0 when the melt polycondensation operation is batchwise. If the number-average polymerization degree is less than 3.0, the reaction product tends to sublime or volatize when transferred to the melt polycondensation step and placed under a reduced pressure, giving rise to troubles such as blockade of the distillation system. Also, much time is required for completing the melt polycondensation reaction, which tends to cause undesirable change of color tone or reduction of productivity. If the number-average polymerization degree exceeds 10.0, the total number of terminal groups decreases, causing a corresponding increase of the ratio of carboxyl groups in the whole terminal groups, so that the supplemental addition of ethylene glycol may fail to lead to a reduction of terminal carboxyl groups.

The esterification rate of the reaction product in supplemental addition of ethylene glycol is preferably not less than 90%, more preferably not less than 95%. If the esterification rate is less than 75%, since much time is required for the esterification reaction by the supplementally added ethylene glycol, ethylene glycol may be dehydrated and condensed by the acid catalytic action of the terminal carboxyl groups to produce diethylene glycol.

The temperature of the reaction product at the time of supplemental addition of ethylene glycol is usually 250 to 265° C., preferably 255 to 265° C., and its relative pressure to the atmospheric pressure is usually normal pressure to 1.0× $10^5$ Pa, preferably normal pressure to 0.5×$10^5$ Pa, more preferably normal pressure to 0.3×$10^5$ Pa.

If the temperature of the reaction product is below the above-defined range, the inside of the reaction system may be cooled by the addendum of ethylene glycol to solidify the reaction product. On the other hand, if the reaction product temperature exceeds the above-defined range, there may take place vehement evaporation or volatilization of the supplemented ethylene glycol. Also, ethylene glycol tends to be dehydrated and condensed by the acid catalytic action of the terminal carboxyl groups to encourage formation of diethylene glycol. If the pressure is below the above-defined range, evaporation or volatilization of the supplemented ethylene glycol may become vehement, and if the pressure is higher than the above-defined range, ethylene glycol tends to be dehydrated and condensed by the acid catalytic action of the terminal carboxyl groups to encourage formation of diethylene glycol.

The supplementary addition of ethylene glycol can be conducted at one or plural points between the said esterification step and the melt polycondensation step, the said points being within the said ranges of temperature and pressure, in a way such that the reaction product will satisfy the said esterification rate and the said number-average polymerization degree, but this supplementary addition is preferably made to the reaction product at a stage before a reduced pressure condition is created. It is more preferable to make the addition to the reaction product under normal pressure before a reduced pressure condition is brought up in the melt polycondensation step.

The amount of the supplementally added ethylene glycol is usually 4 to 40% by weight of the theoretical yield of the polyethylene terephthalate resin. In case where the supplemental addition of ethylene glycol is conducted in the esterification step, its amount is usually 4 to 20% by weight, preferably 4 to 15% by weight of the theoretical yield. When the amount of supplemental addition is below the above-defined range, the terminal carboxyl groups tend to increase, and when it exceeds the defined range, there may take place cooling and solidification of the reaction product in the system or a reduction of polymerization degree due to depolymerization.

The ethylene glycol used for the supplemental addition may not necessarily be pure ethylene glycol; it may be ethylene glycol used as a solvent or dispersant for the copolymerization materials, catalyst or other additives. It is also possible to use ethylene glycol distilled out in the esterification step or the polycondensation step, or a mixture containing such ethylene glycol.

The polyethylene terephthalate resins of the present invention can be produced more effectively by conducting both addition of the said compounds and supplemental addition of ethylene glycol.

The polyethylene terephthalate resin according to the first aspect of the present invention is a polyethylene terephthalate resin which has an intrinsic viscosity [$\eta_2$] of not less than 0.70 dl/g and not more than 1.50 dl/g and an acetaldehyde content ($AA_0$ (ppm by weight)) of not more than 10 ppm by weight, and has such properties that the acetaldehyde content [$AA_1$ (ppm by weight)] of the molded product obtained by injection molding the resin at 280° C. with its moisture content adjusted to 30±20 ppm by weight and the acetaldehyde content [$AA_2$ (ppm by weight)] of the molded product obtained by injection molding the resin at 280° C. with its moisture content adjusted to 120±20 ppm by weight satisfy the following formula (1):

$$[(AA_1-AA_2)/AA_1]\times 100 \geq 30 \quad (1)$$

The intrinsic viscosity ([$\eta_2$]) shown herein of the polyethylene terephthalate resins of the present invention designates the value measured at 30° C. using a 1/1 (by weight) mixture of phenol and tetrachloroethane as solvent. This intrinsic viscosity ([$\eta_2$]) is preferably 0.72 to 1.00 dl/g, more preferably 0.75 to 0.95 dl/g. It should be preferably 0.78 to 0.85 dl/g when the resin is to be used for the bottles which are required to have heat resistance, and preferably 0.85 to 0.93 dl/g in use for the bottles of which pressure resistance is required. When intrinsic viscosity ([$\eta_1$]) is below the above-defined range, the molded product lacks mechanical strength, and when it exceeds the above-defined range, melt moldability of the resin deteriorates and it also becomes difficult to control the formation of acetaldehyde and other by-products in the melt molding operation.

The acetoaldehyde content ($AA_0$) of the polyethylene terephthalate resins of the present invention shown here designates the value obtained by gas chromatographic determination of acetaldehyde extracted into pure water after 2-hour extraction of the resin pellets in 160° C. pure water. The weight of the individual resin pellets used for the extraction is usually 10 to 40 mg.

The acetaldehyde content ($AA_0$) is preferably not more than 5.0 ppm by weight, more preferably not more than 3.0 ppm by weight. When the acetaldehyde content exceeds the above-defined range, the molded product may maintain an undesirably high content of acetaldehyde, which may damage the flavor of the contents of the molded product when it is a container.

For the polyethylene terephthalate resin of the present invention, it is an essential requirement that the acetaldehyde content [$AA_1$ (ppm by weight)] of the molded product obtained by injection molding the said resin at 280° C. with its moisture content adjusted to 30±20 ppm by weight and the acetaldehyde content [$AA_2$ (ppm by weight)] of the molded product obtained by injection molding the said resin at 280° C. with its moisture content adjusted to 120±20 ppm by weight satisfy the following formula (1). Preferably the said factors satisfy the following formula (2), more preferably the following formula (3). If the said factors fail to satisfy the following formula (1), it proves difficult to suppress the formation of the by-product acetaldehyde during melt molding.

$$[(AA_1-AA_2)/AA_1] \times 100 \geq 30 \quad (1)$$

$$[(AA_1-AA_2)/AA_1] \times 100 \geq 40 \quad (2)$$

$$[(AA_1-AA_2)/AA_1] \times 100 \geq 50 \quad (3)$$

The above-cited moisture content of 30±20 ppm by weight is the moisture content of the polyethylene terephthalate resins when treated under an ordinary drying condition which is commonly used for melt molding of the resins, and the above-cited moisture content of 120±20 ppm by weight is the moisture content selected as a range in which the polyethylene terephthalate resins remain safe from any excessive reduction of intrinsic viscosity by hydrolysis, with the possible formation of acetaldehyde as a by-product being taken into account. The above-cited temperature of 280° C. is a typical temperature used for melt molding of the polyethylene terephthalate resins.

Thus, the above-shown formulae indicate the rate at which the acetaldehyde content [$AA_2$] of the molded product obtained by melt molding the resin with its moisture content adjusted to stay in an appropriate range is lowered in comparison to the acetaldehyde content [$AA_1$] of the molded product obtained by melt molding the resin with a moisture content provided by conventional drying means. The greater the value of the left side of the formula (1), the less the acetaldehyde content of the molded product can be made when molding is conducted with the moisture content of the resin adjusted to stay in an appropriate range.

The above-cited moisture contents have been determined by the Carl-Fischer method. As means for adjusting moisture content of the polyethylene terephthalate resin to 30±20 ppm by weight, for instance a method can be used in which the resin is dried at 145° C. under a pressure of 10 Torr for 15 hours in a vacuum dryer. Also, adjustment of moisture content of the polyethylene terephthalate resin to 120±20 ppm by weight can be effected, for instance, by a method in which the resin with a moisture content of 30±20 ppm by weight is moistened in a thermostatic oven of 30° C. and 60% RH for one hour.

The above-mentioned acetaldehyde content of the molded object is the value obtained by gas chromatographic determination of the acetaldehyde extracted into pure water after 2-hour extraction of the pelletized molded product in 160° C. pure water.

The molded products mentioned above are those obtained by molding the resins by an injection molding machine with its cylinder temperature set at 280° C. As the molding machine, for instance "ASB50TH" mfd. by Nissei ASB Machinery Co., Ltd. can be used. As the mold adapted to ASB50TH, there can be used, for instance, a type which is capable of simultaneously molding two pieces of preform for 500 ml drink bottles. Following is an exemplification of the molding conditions: injection time=18 seconds, cooling time=10 seconds, molding cycle=33 seconds, mold cooling water temperature=15° C., screw speed=100 rpm, and hydraulic pressure indication as back pressure during plasticization=1 MPa.

In the polyethylene terephthalate resins of the present invention, the cyclic trimer content is not more than 0.5% by weight, and preferably the cyclic trimer content [$CT_1$ (wt %)] of the molded product obtained by injection molding the resin at 280° C. with its moisture content adjusted to 30±20 ppm by weight and the cyclic trimer content [$CT_2$ (wt %)] of the molded product obtained by injection molding the resin at 280° C. with its moisture content adjusted to 120±20 ppm by weight satisfy the following formula (4), more preferably the following formula (5). Satisfying the following formulae provides the advantages such as non-contamination of the mold in the blow molding operation. The said cyclic trimer content [$CT_2$] is preferably as close to 0 as it can be.

$$CT_1-CT_2 \geq 0.01 \quad (4)$$

$$CT_1-CT_2 \geq 0.05 \quad (5)$$

The above formulae show the degree to which the cyclic trimer content [$CT_2$] of the molded product obtained from melt molding with the moisture content adjusted to stay in an appropriate range is lessened in comparison with the cyclic trimer content [$CT_1$] of the molded product obtained from melt molding with a moisture content provided by conventional drying means. It is seen that the greater the value of the left side of each formula, the less the cyclic trimer content of the molded product becomes when molding is conducted with the moisture content adjusted to remain in an appropriate range.

The above-mentioned cyclic trimer content is the value obtained from liquid chromatographic determination of the amount of cyclic trimer in a solution prepared by dissolving the dried resin in a chloroform/hexafluoroisopropanol (3/2 by volume) mixed solvent, diluting the resulting solution with chloroform, adding methanol thereto, filtering out the precipitate, evaporating the resulting liquid filtrate to dryness, and dissolving it in dimethylformamide.

The above-mentioned moisture content was determined by the Carl-Fischer method as in the case of acetaldehyde content. The method of adjusting moisture content of the resin and the molding conditions are also the same as used in determination of acetaldehyde content. The cyclic trimer content ($CT_0$) is preferably not more than 0.4% by weight, more preferably not more than 0.35% by weight, most preferably not more than 0.30% by weight. The lower the cyclic trimer content, the less likely the contamination of the blow mold.

The amount of terminal carboxyl groups of the polyethylene terephthalate resins of the present invention is usually not more than 20 equivalents/ton of resin, preferably not more than 15 equivalents/ton of resin, more preferably not more than 10 equivalents/ton of resin. If the amount of terminal carboxyl groups exceeds the above-defined range, the cyclic trimer content increases and contamination of the mold tends to occur during molding of bottles or other products. Also, when melt molding is carried out in a state of higher moisture content than usual as in the present invention, a hydrolytic reaction of the resin tends to take place with the terminal carboxyl groups acting as an acid catalyst, causing a reduction of intrinsic viscosity.

The polyethylene terephthalate resin in a preferred embodiment of the present invention, as mentioned above, is produced by carrying out a polycondensation reaction using a titanium compound and a magnesium compound as polycondensation reaction catalyst and a phosphorus compound as assistant, and in this reaction, it is preferable that the following conditions are met in view of catalyst activity in the polycondensation reaction and quality of the polyethylene terephthalate resin. That is, when the content of the titanium compound calculated as titanium atoms is represented by T (mols/ton of resin), the content of the magnesium compound calculated as magnesium atoms is represented by M (mols/ton of resin) and the content of the phosphorus compound calculated as phosphorus atoms is represented by P (mols/ton of resin), T, M and P satisfy the following formulae (I) to (V):

$$0.020 \leq T \leq 0.200 \quad (I)$$

$$0.040 \leq M \leq 0.400 \quad (II)$$

$$0.020 \leq P \leq 0.300 \quad (III)$$

$$0.90 \leq M/P \leq 1.80 \quad (IV)$$

$$0.50 \leq M/T \leq 3.50 \quad (V)$$

Also, the polyethylene terephthalate resin according to a preferred embodiment of the present invention is produced, as mentioned above, by carrying out a polycondensation reaction using a titanium compound and a calcium compound as polycondensation reaction catalyst and a phosphorus compound as assistant, and in this reaction, it is preferable that the following conditions are met in view of catalyst activity in the polycondensation reaction and quality of the polyethylene terephthalate resin. That is, when the content of the titanium compound calculated as titanium atoms is represented by T (mols/ton of resin), the content of the calcium compound calculated as calcium atoms is represented by C (mols/ton of resin) and the content of the phosphorus compound calculated as phosphorus atoms is represented by P (mols/ton of resin), T, C and P satisfy the following formulae (I), (III) and (VI) to (VIII):

$$0.020 \leq T \leq 0.200 \quad (I)$$

$$0.020 \leq P \leq 0.300 \quad (III)$$

$$0.075 \leq C \leq 0.800 \quad (VI)$$

$$0.80 \leq C/P \leq 4.00 \quad (VII)$$

$$1.00 \leq C/T \leq 20.00 \quad (VIII)$$

Further, the polyethylene terephthalate resin of the present invention in a preferred embodiment thereof is produced, as mentioned above, by carrying out a polycondensation reaction using a titanium compound, a magnesium compound and a calcium compound as polycondensation reaction catalyst and a phosphorus compound as assistant, and in this reaction, it is preferable that the following conditions are met in view of catalyst activity in the polymerization reaction and quality of the polyethylene terephthalate resin. That is, when the content of the titanium compound calculated as titanium atoms is represented by T (mols/ton of resin), the content of the magnesium compound calculated as magnesium atoms is represented by M (mols/ton of resin), the content of the calcium compound calculated as calcium atoms is represented by C (mols/ton of resin) and the content of the phosphorus compound calculated as phosphorus atoms is represented by P (mols/ton of resin), T, M, C and P satisfy the following formulae (I) to (VIII):

$$0.020 \leq T \leq 0.200 \quad (I)$$

$$0.040 \leq M \leq 0.400 \quad (II)$$

$$0.020 \leq P \leq 0.300 \quad (III)$$

$$0.90 \leq M/P \leq 1.80 \quad (IV)$$

$$0.50 \leq M/T \leq 3.50 \quad (V)$$

$$0.075 \leq C \leq 0.800 \quad (VI)$$

$$0.80 \leq C/P \leq 4.00 \quad (VII)$$

$$1.00 \leq C/T \leq 20.00 \quad (VIII)$$

In the said catalyst system, the content T of the titanium compound calculated as titanium atoms preferably satisfies the following formula (I), more preferably the following formula (I'), even more preferably the following formula (I"). If the content T is less than the values of the left sides of the following formulae, the polycondensation reactivity in the solid-phase polycondensation reaction tends to fall, and if the content T exceeds the right side values of the respective formulae, the resin tends to assume a yellowish color tone and also the acetaldehyde content in the molded product tends to increase.

$$0.020 \leq T \leq 0.200 \quad (I)$$

$$0.060 \leq T \leq 0.100 \quad (I')$$

$$0.070 \leq T \leq 0.90 \quad (I'')$$

In the above-mentioned catalyst system, the content M of the magnesium compound calculated as magnesium atoms preferably satisfies the following formula (II), more preferably the following formula (II'), even more preferably the following formula (II"). If the content M is less than the values of the left sides of the following formulae, polycondensation reactivity and cyclic trimer reducing rate in the solid-phase polycondensation reaction tend to decline. If the content M exceeds the right side values, color tone and thermal stability of the resin tend to deteriorate in addition to the decline of polycondensation reactivity and cyclic trimer reducing rate in the solid-phase polycondensation reaction.

$$0.040 \leq M \leq 0.400 \quad (II)$$

$$0.060 \leq M \leq 0.300 \quad (II')$$

$$0.110 \leq M \leq 0.220 \quad (II'')$$

Also in the above catalyst system, the content P of the phosphorus compound calculated as phosphorus atoms preferably satisfies the following formula (III), more preferably the following formula (III'), even more preferably the following formula (III"), especially preferably the following formula (III'''). If the content P is less than the values of the left sides of the following formulae, thermal stability of the resin tends to go down, and if the content P exceeds the values of the right sides, polycondensation reactivity and cyclic trimer reducing rate in the solid-phase polycondensation reaction tend to decline.

$$0.020 \leq P \leq 0.300 \tag{III}$$

$$0.050 \leq P \leq 0.200 \tag{III'}$$

$$0.080 \leq P \leq 0.180 \tag{III''}$$

$$0.090 \leq P \leq 0.150 \tag{III'''}$$

It is preferable for the polyethylene terephthalate resins of the present invention to satisfy the following formulae (IV) and (V) regarding the M/P and M/T ratios in addition to satisfying the above-shown formulae (I) to (III). As regards preference, the lower formula is the more preferred, that is, regarding M/P, the formula (IV') is especially preferred, and regarding M/T, the formula (V'') is especially preferred. If M/P and M/T are less than the values of the left sides of the formulae or exceed the values of the right sides, polycondensation reactivity and cyclic trimer reducing rate in the solid-phase polycondensation reaction tend to decline and also thermal stability of the resin falls down.

$$0.90 \leq M/P \leq 1.80 \tag{IV}$$

$$1.10 \leq M/P \leq 1.50 \tag{IV'}$$

$$0.50 \leq M/T \leq 3.50 \tag{V}$$

$$1.00 \leq M/T \leq 2.90 \tag{V'}$$

$$1.50 \leq M/T \leq 2.40 \tag{V''}$$

In the polyethylene terephthalate resins of the present invention, the content C of the calcium compound calculated as calcium atoms preferably satisfies the following formula (VI), more preferably the following formula (VI'), even more preferably the following formula (VI''). If the content C is less than the values of the left sides of the formulae, color tone of the resin becomes bad and also polycondensation reactivity, especially solid-phase polycondensation reactivity tend to lower. If the content C exceeds the values of the right sides, polycondensation reactivity, especially solid-phase polycondensation reactivity tend to lower.

$$0.075 \leq C \leq 0.800 \tag{VI}$$

$$0.150 \leq C \leq 0.350 \tag{VI'}$$

$$0.200 \leq C \leq 0.300 \tag{VI''}$$

Further, it is preferable for the polyethylene terephthalate resins of the present invention to satisfy the following formulae (VII) and (VIII) regarding C/P and C/T in addition to satisfying the above-shown formulae (I), (VI) and (III). As for preference, the lower formula is the more preferred, that is, regarding C/P, the formula (VII'') is especially preferred, and regarding C/T, the formula (VIII'') is especially preferred. If C/P and C/T are less than the values of the left sides of the following formulae, color tone of the resin tends to become yellowish and also polycondensation reactivity, especially solid-phase polycondensation reactivity tends to lower. If C/P and C/T exceed the right side values, polycondensation reactivity and color tone of the resin tend to deteriorate.

$$0.80 \leq C/P \leq 4.00 \tag{VII}$$

$$1.00 \leq C/P \leq 2.00 \tag{VII'}$$

$$1.10 \leq C/P \leq 1.50 \tag{VII''}$$

$$1.00 \leq C/T \leq 20.00 \tag{VIII}$$

$$2.00 \leq C/T \leq 5.00 \tag{VIII'}$$

$$2.40 \leq C/T \leq 4.00 \tag{VIII''}$$

In case where the polyethylene terephthalate resins of the present invention are produced by using an aluminum compound as polycondensation reaction catalyst, the content A (mols/ton of resin) of the aluminum compound calculated as aluminum atoms is preferably one which satisfies the following formula (IX). If the content A is less than the value of the left side of the following formula, polycondensation reactivity tends to decline, and if the content A exceeds the value of the right side, thermal and oxidative stability of the resin tends to lower and there also tends to take place tinting of the resin or generation of alien matter originating in aluminum present in the resin.

$$0.040 \leq A \leq 4.00 \tag{IX}$$

In the polyethylene terephthalate resins of the present invention, it is possible to contain, as required, various additives such as infrared absorber, antioxidant, ultraviolet absorber, light stabilizer, antistatic agent, lubricant, anti-blocking agent, anti-fogging agent, nucleating agent, plasticizer, colorant, dispersant, filler, etc. The mixture is melt kneaded by a conventional method to be prepared as a molding material and subjected to melt molding such as injection molding, blow molding, extrusion molding, compression molding, etc., by a conventional method. Particularly when the process for producing the polyethylene terephthalate resin moldings according to the second aspect of the present invention, the characteristic properties of the resins are manifested specifically and the excellent moldings can be obtained.

The process (I) for producing polyethylene terephthalate resin moldings according to the second point of the present invention is explained below.

The process (I) according to the present invention is a process for producing polyethylene terephthalate resin moldings which process comprises using a polyethylene terephthalate resin as defined in any one of Claims 1 to 9 as starting material, melt molding it with its moisture content adjusted to be not less than 60 ppm by weight and not more than 300 ppm by weight. The lower limit of the preferred moisture content of the polyethylene terephthalate resins is 100 ppm and its upper limit is 200 ppm.

If the moisture content is below the above-defined range, it may become difficult to sufficiently reduce the acetaldehyde content and cyclic trimer content in the moldings, and if the moisture content exceeds the above range, an excessive decrease of intrinsic viscosity of the resin may take place during molding, causing deterioration of mechanical strength of the obtained moldings.

For adjusting moisture content of the polyethylene terephthalate resins, a method may be used in which the resin is dried by a vacuum dryer, dry gas circulating dryer or like means while adjusting the drying temperature, drying time, dry gas flow rate, gas pressure, dry gas humidity (dew point), pressure in the drying system, etc. Several methods are available for altering the dry gas humidity (dew point): for instance, temperature, time and amount of the moisture absorber applied when removing moisture in the gas by a moisture absorber such as silica gel and synthetic zeolite are adjusted; the gas dehumidified by a moisture absorber is bubbled through water to increase moisture content in the gas; the gas dehumidified by a moisture absorber is mixed with a gas which has been saturated in moisture content; the once dried resin is humidified in a thermostatically controlled oven. A proper method is selected in consideration of moisture content of the polyethylene terephthalate resin to be adjusted in humidity and other factors.

In the present invention, it is preferable that intrinsic viscosity ($IV_0$) of the resin before molding and intrinsic viscosity ($IV_1$) of the molded product satisfy the following formula:

$$0.75 \leq IV_1/IV_0 \leq 0.95$$

Now, the process (II) for producing the polyester resin moldings according to the third aspect of the present invention is described.

The process (II) for producing resin moldings according to the present invention is a process for producing polyester resin moldings which process uses, as starting material, a polyester resin mixture (c) with its moisture content adjusted to 60 to 300 ppm by weight, said mixture comprising, in a ratio of (a)/(b)>1, a polyester resin (a) having a moisture content of less than 60 ppm by weight and a thermoplastic resin (b) other than the polyester resin (a) and having a moisture content of not less than 60 ppm by weight. This process (II) has the following advantages over the process (I) described above.

The above-said moisture adjusting methods require fine control of the various conditions. Also, since a dryer and a drying equipment of specified capacities are required, much time is taken until the resin is stabilized with a required moisture content when molding is resumed after the molding machine has been stopped for cleaning of the mold or other reasons, and during this period, moisture content of the resin may become labile, making it hard to sufficiently reduce the aldehyde content in the molded product. According to the above moisture adjusting methods, it is indeed possible to obtain the molded products constantly if the stabilized molding operation is carried on, but when molding is resumed after change of the molding conditions, there may be produced the non-conforming molded products whose aldehyde content is not at the desired level, resulting in a reduced rate (yield) of the conforming products (the products with an acceptable level of aldehyde content) in the whole molded products. In contrast, according to the resin moldings producing process (II) of the present invention, it suffices to provide an equipment for adding and mixing a thermoplastic resin (b) having a moisture content of not less than 60 ppm with a polyester resin (a) having a moisture content of less than 60 ppm obtained from an ordinary existing drying equipment and to alter the amount of the thermoplastic resin (b) added so that the average moisture content of the mixture (c) will take a specified value. Thus this process has the advantage of allowing easy control of moisture content of the resin to elevate the yield of the conforming products.

Various types of thermoplastic resins can be used as the thermoplastic resin (b) used in the resin moldings producing process (II) according to the present invention.

For instance, as the resins effective for reducing the acetaldehyde content or improving gas barrier properties, polyamide resins such as polyamide 6, polyamide 66, polyamide MXD6 and polyamide 6T6I, specifically "Novamid" and "Reny" produced by Mitsubishi Engineering-Plastics Corporation, can be used. These resins preferably have a melting point of around 210 to 270° C., and their mixing ratio to the mixture (c) is preferably 0.5 to 10% by weight.

For the improvement of crystallizability, polybutylene terephthalate resins, for example, "Novaduran" produced by Mitsubishi Engineering-Plastics Corporation, can be used. These resins preferably have a melting point of around 220 to 270° C., and their mixing ratio to the mixture (c) is preferably in the range of 1 to 20% by weight. For the purpose of improving crystallizability, it is also possible to use other resins than polyester resins, for instance polyethylene resins such as "Novatec LL", "Novatec HD", "Novatec LD", "Novatec C6" and "Novatec EVA" produced by Japan Polyethylene Corporation. These resins preferably have a melting point of around 80 to 140° C. It is also possible to use polypropylene resins a typical example of which is "Novatec PP" produced by Japan Polypropylene Corporation. These resins preferably have a melting point of around 150 to 170° C. The mixing ratio of such polyethylene or polypropylene resin is preferably in the range of 1 to 20% by weight based on the mixture (c).

Polyethylene naphthalate resins can be cited as examples of the resins useful for improving heat resistance. These resins are preferably of a melting point of around 240 to 270° C. Polycarbonate resins such as "Novarex" and "Iupilon" produced by Mitsubishi Engineering-Plastics Corporation, are also of use as the resins for improving heat resistance. These resins are preferably of a glass transition point of around 130 to 150° C. Other resins also effective for improving heat resistance include polyarylate resins such as "U-Polymer" produced by Unitica Ltd. These resins preferably have a thermal deformation temperature of around 100 to 180° C. The mixing ratio of polyethylene naphthalate resin, polycarbonate resin and polyarylate resin is preferably in the range of 1 to 20% by weight based on the mixture (c).

Polymethyl methacrylate resins, such as "KAMAX" produced by Sumitomo Chemical Industries Co., Ltd., can be cited as examples of the resins useful for improving surface gloss. These resins are preferably of a Vicat softening point of around 110 to 170° C., and their mixing ratio is preferably in the range of 1 to 20% by weight based on the mixture (c).

In the resin moldings producing process (II) according to the present invention, the polyethylene terephthalate resins according to the first aspect of the present invention described above are suited for use as the polyester resin (a) with a moisture content of less than 60 ppm by weight. The shape of the resin used in this process is usually granule, preferably ellipsoidal columnar or spherical pellet. As the thermoplastic resin (b) with an average moisture content of not less than 60 ppm, preferably the polyethylene terephthalate resins according to the first aspect of the present invention are used by adjusting their average moisture content to not less than 60 ppm. The polyester resin (a) to the thermoplastic resin (b) mixing ratio in the mixture (c) is defined to satisfy the condition of (a)/(b)>1. The upper limit of this mixing ratio is usually 200, and it preferably satisfies the condition of (a)/(b) >2, more preferably the condition of (a)/(b)>9.

The screw of the injection or extrusion molding machine is divided into a material feeding section, compressing section and metering section. In the present invention, mixing of the thermoplastic resin (b) may be made at any point between the material charging hopper and the material feeding section of the screw in the molding machine. Such mixing point is preferably the joint of the material charging hopper with the molding machine, more preferably the molding machine side of the said joint. Mixing of the thermoplastic resin (b) is usually conducted by an adding equipment adapted to the molding machine. It may be performed at one location or at several locations.

The temperature of polyester resin (a) at the site of mixing of thermoplastic resin (b) is usually not lower than 60° C. and not higher than 170° C., preferably not lower than 70° C. and not higher than 140° C., more preferably not lower than 80° C. and not higher than 120° C. When the polyester resin (a)

temperature is lower than 60° C., a large equipment and much time are required for lowering the temperature of polyester resin (a). Also, if thermoplastic resin (b) is added to polyester resin (a) when its temperature is lower than 60° C., the molded product tends to become cloudy, spoiling its transparency. When the temperature of polyester resin (a) is higher than 170° C., the moisture contained in thermoplastic resin (b) tends to evaporate, causing a variation (decrease) of moisture content in the mixture (c) used for melt molding and a corresponding variation of acetaldehyde content in the molded product.

Usually, thermoplastic resin (b) is used in the form of ellipsoidal columnar or spherical pellets of the same size as those of polyester resin (a). In this case, there may be provided a means for sampling out the mixture (c) before the resin is melted to measure moisture content of the sampled-out mixture (c). However, it is actually difficult to correctly measure moisture content of the mixture (c) for the reasons such that moisture is evaporated from the mixture (c) in the course of measurement. Therefore, moisture content of the mixture (c) is calculated as a weighted mean using the following equation from moisture content of polyester resin (a) and that of thermoplastic resin (b), by which it is possible to adjust moisture content to the desired level with no need of analyzing moisture content of the mixture (c).

{moisture content (ppm) of mixture $(c)$}={moisture content (ppm) of polyester resin $(a)$×ratio (wt %) of polyester resin $(a)$ in the mixture $(c)$}/100+ {moisture content (ppm) of thermoplastic resin $(b)$×ratio (wt %) of thermoplastic resin $(b)$ in mixture $(c)$}/100

In case where shape and size differ between polyester resin (a) and thermoplastic resin (b), by adopting (moisture content for calculation of mixing ratio) determined from the following equation in place of {moisture content (ppm) of thermoplastic resin (b)} when determining moisture content of the mixture (c) from the above-shown formula of weighted mean, it is possible to obtain the desired molded products with a low acetaldehyde content. This method excels in promptness of determination and is industrially very advantageous in comparison with the method in which water content of the mixture (c) must be analyzed.

Moisture content for calculation of mixing ratio=moisture content of thermoplastic resin $(b)$×surface area per unit volume of polyester resin $(a)$/surface area per unit volume of thermoplastic resin $(b)$ The above method is effective particularly in the following cases. When the size of thermoplastic resin (b) is small in comparison with polyester resin (a) or when a recycled material (crushed body portion of bottles, films, etc.) is used as thermoplastic resin (b), moisture in the resin is evaporated quickly because of large surface area of thermoplastic resin (b), so that the effective moisture content decreases in the melt molding operation, making it unable to produce the sufficient effect to suppress the formation of by-product acetaldehyde. In such a case, the effective moisture content for molding (moisture content for calculation of mixing ratio) is calculated from the actual moisture content in thermoplastic resin (b) according to the above-shown equation, and by using the obtained value, it is possible to calculate the mixing ratio. In this way, it is possible to prevent the fall of the effect of the present invention due to evaporation of moisture caused by the difference in size and shape of the resins.

The ratio (Sa/S) of the surface area (Sa) per unit volume of polyester resin (a) to the surface area (S) per unit volume of thermoplastic resin (b) is not specifically defined in the present invention, but it is usually not less than 0.1 and not more than 1, preferably not less than 0.2 and not more than 1, more preferably not less than 0.5 and not more than 1. When this ratio of surface area is less than 0.1, it means that the grain size of thermoplastic resin (b) is very small or the resin is in the form of very thin film. Therefore, the resin tends to adhere to the equipment wall surface, etc., to cause a variation of mixing ratio, making it unable to obtain stabilized quality of the molded products. The "surface area per unit volume" mentioned here is a value calculated by measuring visual size of the resin. More specifically, 30 granules of resin are picked out at random, and their surface areas are calculated by measuring the external sizes of the individual granules, from which the mean surface area of the 30 granules is determined. Similarly, the volumes of the individual granules are calculated from the measurement of visual sizes, and the mean volume of the 30 granules is determined. The thus determined mean surface area of the 30 granules is divided by the mean volume, and the obtained value is expressed as surface area per unit volume. The visual size can be measured by slide calipers or micrometers or by enlarged observation by a projector or microscope.

The process (III) for producing polyester resin moldings in the fourth aspect of the present invention is described below.

The process (III) according to the present invention is a process for producing polyester resin moldings using an injection or extrusion molding machine, which process comprises using a polyester resin (a) having a moisture content of below 60 ppm by weight as starting material, and adding water and/or a liquid containing water to the polyester resin (a) at a point between the material charging hopper attached to the molding machine and the material feeding section of the screw in the molding machine, in which the ratio of water added to the weight of polyester resin (a) supplied to the molding machine is adjusted to be not less than 30 ppm by weight and not more than 2,000 ppm by weight. This process (III) has the following advantages over the process (II) described before.

In the case of the process (II), a large equipment is necessary for forming a mixture (c) by mixing a polyester resin (a) and a thermoplastic resin (b), and it is also necessary to accurately control the average moisture content of the thermoplastic resin (b). Thus, this process has the problem that fine control of the various operational conditions is necessary for providing the desired moisture content. According to the process (III) on the other hand, since it only needs to supplement a means for adding water to the existing equipment, the equipment cost is low, and further, since the average moisture content of the polyester resin (a) can be readily brought to the desired level by changing the amount of water added, the yield of molded products is high. Thus, in view of the fact that it has been common practice in the art to melt mold the polyester resins after drying them for preventing their hydrolysis, it can be said that the effect of the process (III) of the present invention to realize suppression of the formation of by-product acetaldehyde during melt molding and a satisfactory reduction of acetaldehyde content in the molded product by carrying out melt molding while directly adding water to the resin is quite an unexpected matter.

Water to be added may be in the form of liquid, vapor or solid, but liquid is preferred in view of handiness such as ease of stabilizing the supply. No specific restrictions are imposed on the type of water used in the present invention; it is possible to use, for instance, river water, lake water, rain water, refined version thereof, well water, hot spring water, mineral spring water, city water and their refined version (distilled water or ion exchange water). As the liquid containing water, for instance a mixture of water and an organic solvent such as an alcohol can be used. In water or the liquid containing water, there may exist a third component, for example, compounds of metals such as sodium, potassium, magnesium, calcium, aluminum, iron and zinc, compounds of nonmetals such as phosphorus, silicon, nitrogen, carbon and oxygen, and other organic compounds.

The amount of the fine particles (the particles with a size of 1 to 40 μm) existing in water or the liquid containing water is preferably controlled in the manner described below. In view of crystallization speed and transparency of the molded products, the upper limit of content of the fine particles is usually 100,000 particles/10 ml, preferably 80,000 particles/10 ml, more preferably 50,000 particles/10 ml. From the economical standpoint, the lower limit of content of the fine particles is usually 10 particles/10 ml, preferably 50 particles/10 ml, more preferably 100 particles/10 ml.

As mentioned above, the screw of the injection or extrusion molding machine is divided into a material feeding section, a compressing section and a metering section. In the present invention, addition of water and/or a water-containing liquid is made at an optional position between the material charging hopper and the material feeding section of the screw in the molding machine. Such position of addition of water is preferably the joint between the material charging hopper and the molding machine, more preferably the molding machine side of the said joint. Usually addition of water and/or a water-containing liquid is conducted using an adding equipment adapted to the molding machine. It may be performed at one location or at several locations.

Temperature of the polyester resin at the site of addition of water and/or a water-containing liquid is usually not lower than 60° C. and not higher than 170° C., preferably not lower than 70° C. and not higher than 140° C., more preferably not lower than 80° C. and not higher than 120° C. When the polyester resin temperature is lower than 60° C., a large equipment and much time are required for lowering the temperature of the polyester resin which has been dried to a moisture content of not more than 60 ppm by weight by a resin dryer. Also, when water is added to the polyester resin of a temperature lower than 60° C., the molded product tends to become cloudy. When the polyester resin temperature exceeds 170° C., the water added tends to evaporate, causing a variation (decrease) of the amount of moisture used for melt molding with the resin and a corresponding variation of acetaldehyde content in the molded product.

In addition of water and/or a water-containing liquid, the ratio by weight of water to the polyester resin used for moisture adjustment is roughly as follows. In case where the polyester resin temperature at the site of addition of water and/or a water-containing liquid is not higher than 100° C., the ratio of water added to the resin is usually 30 to 1,000 ppm by weight, preferably 50 to 500 ppm by weight, and in case where the polyester temperature at the site of addition of water and/or a water-containing liquid exceeds 100° C., the ratio of water added to the resin is usually 50 to 2,000 ppm by weight, preferably 100 to 1,000 ppm by weight.

To "add water and/or a water-containing liquid continuously" means to add them in a state where the screw of the molding machine is operating for plasticizing the resin, that is, the resin is flowing. Thus, in case of using an injection molding machine, it is preferable to add them in synchronization with the operation of the screw, and in the case of an extrusion molding machine, since the screw is constantly operating, it is preferable to conduct addition constantly in coordination with this situation. If water and/or a water-containing liquid is added constantly to an injection molding machine in which plasticization by screw operation is performed intermittently, or if water and/or a water-containing liquid are added intermittently to an extrusion molding machine in which plasticization by screw operation is performed constantly, the ratio of water and/or a water-containing liquid to the resin supplied to the molding machine becomes variable, making it unable to obtain the molded products with stabilized quality.

As the polyester resin (a), it is recommendable to use the polyethylene terephthalate resins according to the first aspect of the present invention described above. The shape of the resin used here is usually granule, preferably ellipsoidal columnar or spherical pellet.

In the above-described resin moldings producing processes (II) and (III) according to the present invention, it is preferable that intrinsic viscosity ($IV_0$) of the resin before molding and intrinsic viscosity ($IV_1$) of the molded product satisfy the following formula:

$$0.75 \leq IV_1/IV_0 \leq 0.95$$

The lower limit of $IV_1/IV_0$ is preferably 0.80, more preferably 0.85, and its upper limit is preferably 0.90. If $IV_1/IV_0$ is too small, intrinsic viscosity of the obtained molded product tends to become low, resulting in a reduced mechanical strength of the molded product. For maintaining mechanical strength required for the molded product, it needs to raise intrinsic viscosity $IV_0$ (dl/g) of the polyester resin offered to melt molding, but this tends to lower productivity of the polyester resin. Also, if $IV_1/IV_0$ is too large, it becomes difficult to reduce the acetaldehyde and cyclic trimer contents in the molded product.

$IV_1/IV_0$ can be adjusted by the moisture content of the resin before molding. That is, moisture in the resin to be subjected to melt molding is adjusted to maintain a proper moisture content. It is also possible to adjust $IV_1/IV_0$ by the mixing ratio of two or more types of resin differing in moisture content from each other or by the amount of water and/or a water-containing liquid supplied to the molding machine. $IV_1/IV_0$ has a tendency that when the moisture content in the resin is large, the ratio becomes small and when the moisture content in the resin is small, the ratio becomes large, and also has a tendency that when the amount of water and/or a water-containing liquid added is large, the ratio becomes small and when the amount is small, the ratio becomes large.

The above-described inventions can be applied advantageously to the production of injection blow molded bottles made by biaxially drawing and blow molding a resin in a blow mold. The injection molding conditions may be those commonly used in the art: for example, cylinder temperature is 260 to 300° C., screw speed is 40 to 300 rpm, injection pressure (relative pressure) is $20 \times 10^6$ to $200 \times 10^6$ Pa, and mold temperature is 5 to 40° C. As for the drawing and blow molding conditions, drawing temperature is 70 to 120° C. and draw ratio is 1.5 to 3.5 times in the longitudinal direction and 2 to 5 times in the circumferential direction. The extrusion molding conditions can be also those commonly used in the art: for example, cylinder temperature=240 to 300° C., screw speed=40 to 300 rpm, discharge pressure (relative pressure)=40 to 140 kg/cm², and cooling drum temperature=5 to 40° C.

It has been found that when a molten resin is molded into a preform by injection molding, there is a certain interrelation between intrinsic viscosity ($IV_1$) of the molded product and time required for injecting the molten resin into the mold. This time required for injection is generally called "filling time". For example, when injection molding is being carried out continuously, if intrinsic viscosity ($IV_1$) of the molded product is unexpectedly varied for some cause or other, causing deviation of $IV_1/IV_0$ from its preferable range, it is difficult to immediately detect such variation of intrinsic viscosity during operation and to change the operating conditions because it takes time to measure intrinsic viscosity. However, if the interrelation between intrinsic viscosity ($IV_1$) of the molded product and filling time is determined in advance, it is possible to detect variation of intrinsic viscosity ($IV_1$) by measuring filling time during operation. Thus, even if intrinsic viscosity ($IV_1$) should be varied during continuous operation, it is possible to maintain $IV_1/IV_0$ stably in its preferable range and to carry on the operation continuously by adjusting moisture content of thermoplastic resin (b), its mixing ratio or the rate of addition of water and/or a water-containing liquid so as to provide a filling time corresponding to the desired intrinsic viscosity ($IV_1$).

EXAMPLES

The present invention is described in further detail by showing the examples thereof, but it should be understood that the present invention is not limited to these examples but can be also embodied otherwise without departing from the scope of the invention. The methods for measurements used in the following Examples and Comparative Examples are as explained below.

(1) Esterification Rate:

1.0 g of the sample crushed by a mortar was precisely weighed out into a beaker, then 40 ml of dimethylformamide was added thereto and the mixture was heated at 180° C. with stirring for 20 minutes to form a solution, after which the beaker wall was washed with 10 ml of dimethylformamide of 180° C. and the solution was cooled down to room temperature. This solution was titrated with a 0.1N ethanol solution of potassium hydroxide by an automatic titrator Potentiograph E-536 (mfd. by Metrohm AG) using a composite PH electrode EA-120. The 0.1N ethanol solution of potassium hydroxide was prepared and standardized according to the method of JIS K8006. From the titer [A (ml)] determined from the inflexion point of the obtained titration curve, the factor [$f_1$] of the 0.1N ethanol solution of potassium hydroxide prepared, standardized and computed by the above-said methods and the sample weight [W (g)], the amount of the free terminal carboxyl groups [AV (meq/g)] was determined according to the following equation:

$$AV(\text{meq/g}) = \{A \times f_1 \times (1/10)\}/W$$

Then 0.3 g of the sample crushed by a mortar was precisely weighed into an Erlenmeyer flask, to which 20 ml of a 0.5N ethanol solution of potassium hydroxide and further 10 ml of pure water were added. After setting a reflux condenser, the solution was refluxed under heating with occasional stirring for 2 hours on a plate resin heater with a surface temperature of 200° C. to hydrolyze the sample. The sample solution was clear at this point. After allowed to cool by itself, the solution was titrated with a 0.5N hydrochloric acid solution using phenolphthalein as indicator. The 0.5N ethanol solution of potassium hydroxide and the 0.5N hydrochloric acid solution were prepared and standardized according to the method of JIS K8006. Phenolphthalein used here was prepared by dissolving 1 g of this compound in 90 ml of ethanol and diluting the solution to 100 ml with pure water. Similar titration was also conducted with the blank under the same conditions. From the titer [Vs (ml)] of the sample, the titer [Vb (ml)] of the blank, the factor [$f_2$] of the 0.5N hydrochloric acid solution prepared, standardized and calculated by the aforesaid methods and the sample weight [W (g)], the amount of the carboxyl groups [SV (meq/g)] deriving from the whole carboxylic acids was determined according to the following equation:

$$SV(\text{meq/g}) = \{(Vb - Vs) \times f_2 \times (1/2)\}/W$$

From the thus determined AV (meq/g) and SV (meq/g), the esterification rate (%) was determined according to the following equation:

$$\text{Esterification rate (\%)} = \{(SV - AV)/SV\} \times 100$$

(2) Amount of Terminal Carboxyl Groups:

The crushed sample was dried by a hot air dryer at 140° C. for 15 minutes and then cooled to room temperature in a desiccator, and 0.1 g of this sample was precisely weighed out and put into a test tube. 3 ml of benzyl alcohol was added thereto and dissolved at 195° C. for 3 minutes while blowing dry nitrogen gas through the solution, after which 5 ml of chloroform was added gradually and the solution was cooled to room temperature. To this solution, 1 to 2 drops of phenol red was added as indicator, and the solution was titrated with stirring with a 0.1N benzyl alcohol solution of sodium hydroxide while blowing dry nitrogen gas through the solution. The titration was finished at the point when the color of the solution changed from yellow to red. The similar operation was carried out with the blank out using the sample, and the acid value was determined from the following equation:

$$\text{Acid value (equivalents/ton of resin)} = (A - B) \times 0.1 \times f/W$$

wherein A is the amount (μl) of the 0.1N benzyl alcohol solution of sodium hydroxide required for the titration; B is the amount (μl) of the 0.1N benzyl alcohol solution of sodium hydroxide required for the titration of the blank; W is the amount (g) of the polyester resin sample; and f is titer of the 0.1N benzyl alcohol solution of sodium hydroxide.

Titer (f) of the 0.1N benzyl alcohol solution of sodium hydroxide was determined in the following way. 5 ml of methanol was collected in a test tube, to which 1 to 2 drops of an ethanol solution of phenol red was added as indicator and the solution was titrated with a 0.1N benzyl alcohol solution of sodium hydroxide until a change of color occurred. Then 0.2 ml of a 0.1N hydrochloric acid solution, whose titer has been known, was added as a standard solution and the solution was again titrated with a 0.1N benzyl alcohol solution of sodium hydroxide till reaching the point of color change. (The above operations were conducted while blowing dry nitrogen gas through the solution.) Titer (f) was calculated from the following equation:

Titer (f) = titer of 0.1N hydrochloric acid Solution × amount of 0.1N hydrochloric acid Solution (μl)/ titer of 0.1N benzyl alcohol solution of sodium hydroxide (3) Intrinsic Viscosity [$\eta_1$] and [$\eta_1$]:

The samples prepared in the following way were used. In the case of pellet resin, 0.25 g of resin sample obtained by freeze-crushing the pellets was used, and in the case of molded product (preform), 0.25 g of resin sample obtained by cutting the preform to the same size as the pellets and freeze-crushing it. Then, using a phenol/tetrachloroethane (1/1 by weight) mixed solution as solvent and adjusting the concentration (c) of the solution to 1.0 g/dl, the sample was dissolved by keeping the temperature at 110° C. for 30 minutes in the case of the resin obtained in the melt polycondensation step and its molded product and at 120° C. for 30 minutes in the case of the resin obtained in the solid-phase polycondensation step and its molded product. Then relative viscosity ($\eta_{rel}$) (relative to the original solution) was measured at 30° C. by a Ubbellohde capillary viscometer, and the ratio ($\eta_{sp}/C$) of specific viscosity ($\eta_{sp}$) determined from relative viscosity ($\eta_{rel}$)−1 to concentration (C) was determined. This ratio ($\eta_{sp}$/C) was also determined when the concentration (c) was adjusted to 0.5 g/dl, 0.2 g/dl and 0.1 g/dl, respectively. Based on these determinations, the ratio ($\eta_{sp}$/C) when the concentration (C) was extrapolated to 0 was determined as intrinsic viscosity (dl/g).

(4) Metallic Atom Content:

The sample was prepared in the following way. 5 g of resin sample was ashed and perfectly decomposed in the usual way with hydrogen peroxide in the presence of sulfuric acid and then diluted to 50 ml with distilled water to prepare the sample. The metallic atoms in the sample were determined by a plasma emission spectroscopic analyzer (Jobin Yvon's CP-AES "JY46P") and converted to mols per ton of polyester resin.

(5) Acetaldehyde Content ($AA_0$, $AA_1$ and $AA_2$):

The sample prepared in the manner described below was used. There were used 5.0 g of pelletized resin sample in the case of pelletized resin and 5.0 g of resin sample cut to a size of 50±10 mg in granule weight in the case of molded product (preform). The sample was charged into a 50 ml micro-bombe (made of SUS-304) together with 10.0 ml of pure water in a nitrogen atmosphere, and after sealed, the micro-bombe was immersed in a 160° C. oil bath so that the micro-bombe would be dipped in its entirety in the oil. After 2-hour heating thereby, the micro-bombe was rapidly cooled in icy water, and the amount of acetaldehyde extracted into pure water was determined by a gas chromatograph (Shimadzu Corp.'s GC-14A) using isobutyl alcohol as an internal standard. The micro-bombe used here was of the following dimensions: outer diameter=27 mm: body portion wall thickness=3 mm; bottom portion wall thickness=5 mm; cover portion wall thickness=15 mm; length (cylindrical body portion)=200 mm; cover=35 mm; screw=20 mm.

(6) Cyclic Trimer Content ($CT_0$, $CT_1$ and $CT_2$):

The sample was prepared in the following way. 10 g of resin sample was dried at 160° C. for 2 hours in an inert oven (Espec's IPHH-201) in a 50 L/min stream of nitrogen gas, and 4.0 mg of this resin was precisely weighed out and dissolved in 2 ml of a chloroform/hexafluoroisopropanol (3/2 by volume) mixed solvent. The solution was diluted by adding 20 ml of chloroform, to which 10 ml of methanol was added, the precipitate was filtered out and the filtrate was evaporated to dryness and dissolved in 25 ml of dimethylformamide to prepare the sample solution. The amount of the cyclic trimer (cyclotriethylene terephthalate resin) in the sample solution was determined by a liquid chromatograph (Shimadzu Corp.'s LC-10A).

(7) Moisture Content:

A dried or moisture-controlled resin sample was quickly sampled out in a solid sample collector of a coulometric titration type moisture meter (Mitsubishi Chemical Corporation's evaporator VA-06 and moisture meter CA-061), which has been sufficiently dried in advance for preventing moisture absorption during sampling, and by setting the evaporator temperature at 230° C. and the operation time at 2 minutes, the moisture content was determined as the sample quantity shown in Table 1 below corresponding to the expected moisture content.

TABLE 1

| Moisture content | Sample quantity |
|---|---|
| Less than 30 ppm | 9 ± 1 g |
| 30 to 100 ppm | 6 ± 1 g |
| 100 to 1000 ppm | 4 ± 1 g |
| More than 1,000 ppm | 1.0 ± 0.3 g |

Example 1

Using a continuous polymerization apparatus comprising a slurry preparation tank, 2-stage esterification reactors connected in series thereto, and 3-stage melt polycondensation tanks connected in series to the 2nd-stage esterification reactor, terephthalic acid and ethylene glycol were continuously supplied to the slurry preparation tank at the rates of 865 parts by weight/hr and 485 parts by weight/hr, respectively, while a 0.3 wt % ethylene glycol solution of ethyl acid phosphate was added continuously in such an amount that the content P of the phosphate calculated as phosphorus atoms would become 0.129 mols per ton of the obtained polyethylene terephthalate resin, and the supplied materials were stirred and mixed to prepare a slurry.

This slurry was transferred to the first-stage esterification reactor set under the conditions of nitrogen atmosphere, 260° C., relative pressure of 50 kPa (0.5 kg/cm$^2$G) and average residence time of 4 hours and then continuously to the 2nd-stage esterification reactor set under the conditions of nitrogen atmosphere, 260° C., relative pressure of 5 kPa (0.05 kg/cm$^2$G) and average residence time of 1.5 hours for carrying out the esterification reaction. Also in this operation, a 0.6 wt % ethylene glycol solution of magnesium acetate tetrahydrate was continuously added through an upper pipe provided to the 2nd-stage esterification reactor, in such an amount that the content of the magnesium compound calculated as magnesium atoms would become 0.165 mols per ton of the obtained polyethylene terephthalate resin, while ethylene glycol was continuously added supplementally at a rate of 30 parts by weight/hr through another upper pipe provided to the 2nd-stage esterification reactor. In this operation, the esterification rate was 85% in the first stage and 95% in the second stage.

The thus obtained esterification reaction product was continuously transferred to the melt polycondensation tanks. To the esterification reaction product in the transfer pipe, tetra-n-butyl titanate was added continuously as an ethylene glycol solution with a titanium atom concentration of 0.15% by weight and a water concentration of 0.5% by weight, in such an amount that the content P of the titanate calculated as titanium atoms would become 0.084 mols per ton of the obtained polyethylene terephthalate resin. The solution was passed continuously to the first-stage melt polycondensation tank set at 270° C. and an absolute pressure of 2.6 kPa (20 Torr), then to the 2nd-stage melt polycondensation tank set at 278° C. and an absolute pressure of 0.5 kPa (4 Torr), and further to the 3rd-stage melt polycondensation tank set at 280° C. and an absolute pressure of 0.3 kPa (2 Torr). The melt polycondensation reaction was carried out by adjusting the residence time in the respective polycondensation reactors so that the obtained resin would have intrinsic viscosity ([$\eta_1$]) of 0.60 dl/g. The reaction product was continuously discharged out in the form of strand from the discharge port provided at the bottom portion of each polycondensation reactor, and after cooled with water, the product was cut into pellets (granule weight: 25±5 mg).

The thus obtained melt polycondensed resin pellets were continuously supplied into a stirring crystallizer maintained at about 160° C. with the residence time being set at about 60 minutes, and the crystallized resin pellets were continuously supplied to a solid-phase polycondensation tower where they underwent solid-phase polycondensation in a nitrogen atmosphere at 215° C. with the residence time being adjusted so that the obtained resin would have an intrinsic viscosity ($[\eta_2]$) of 0.80 dl/g, thus producing polyethylene terephthalate resin A.

Concerning this polyethylene terephthalate resin A, its titanium atom content T (mols/ton of resin), magnesium atom content M (mols/ton of resin) and phosphorus atom content P (mols/ton of resin) were determined, and the M/P and M/T ratios were calculated therefrom, the results being shown in Table 2. Also, acetaldehyde content ($AA_0$) and cyclic trimer content ($CT_0$) of this polyethylene terephthalate resin A were determined, obtaining the results shown in Table 2.

Further, the obtained polyethylene terephthalate resin A was dried in a tray type vacuum dryer (Yamato Science's DP-63) under the conditions of 145° C. and 10 Torr for 15 hours. The moisture content of the polyethylene terephthalate resin A after drying was 20 ppm.

The dried polyethylene terephthalate resin A was injection molded by an injection molding machine (Nissei ASB Machine's ASB50TH) under the conditions of nozzle/barrel temperature of 280° C., hot runner temperature of 270° C. and injection time of 18 seconds. In this operation, the hydraulic pressure of the molding machine, pressure change-over position, injection speed and injection speed change-over position were set so that the filling time and pressure dwell time would become 1.5 seconds and 16.5 seconds, respectively, in the injection period. Also, hydraulic pressure in the dwell period was so set that the indication of the hydraulic pressure gauge (V-91) of the molding machine would register 2.3 MPa. Preforms (33 g/piece, 2 pieces/shot) for 500 ml bottles illustrated in FIG. 1 were injection molded under the conditions of: mold cooling water temperature=15° C.; cooling time=10 seconds; screw speed=100 rpm; indication of hydraulic pressure gauge (V-91) of the molding machine as back pressure during plasticization=1.0 MPa; molding cycle=33 seconds, and the acetaldehyde content ($AA_1$) and cyclic trimer content ($CT_1$) of the sample collected from the 25th shot preform were measured. Results are shown in Table 2.

Then the dried polyethylene terephthalate resin A was kept in a thermostatic oven (Tabai's (Espec Corp.) Platinaless Reinbow PR-IG) under the conditions of 30° C. and 60% RH for approximately one hour to adjust moisture content to 120 ppm. Preforms were injection molded from this moisture-adjusted resin in the same way as described above, and the acetaldehyde content ($AA_2$) and cyclic trimer content ($CT_2$) of the selected sample of the obtained preforms were measured. Results are shown in Table 2.

Example 2

The same procedure as defined in Example 1 was conducted except that a 0.3 wt % ethylene glycol solution of ethyl acid phosphate was added continuously in such an amount that the phosphorus atom content P would become 0.194 mols per ton of the obtained polyethylene terephthalate resin, that a 0.6 wt % ethylene glycol solution of a magnesium acetate tetrahydrate was added continuously in such an amount that the magnesium atom content would become 0.247 mols per ton of the obtained polyethylene terephthalate resin, and that a 0.6 wt % ethylene glycol solution of a calcium acetate dehydrate was added continuously in such an amount that the calcium atom content would become 0.250 mols per ton of the obtained polyethylene terephthalate resin, to produce a polyethylene terephthalate resin B and performs using it.

The titanium atom content T (mols/ton of resin), magnesium atom content M (mols/ton of resin), calcium atom content C (mols/ton of resin) and phosphorus atom content P (mols/ton of resin) of the obtained polyethylene terephthalate resin B were measured, and based on these measurements, the values of M/P, M/T, C/P and C/T were calculated, obtaining the results shown in Table 2. The acetaldehyde content ($AA_0$, $AA_1$, $AA_2$) and cyclic trimer content ($CT_0$, $CT_1$, $CT_2$) were also determined, the results being shown in Table 2.

Comparative Example 1

The same procedure as defined in Example 1 was carried out except that the amounts of ethyl acid phosphate, magnesium acetate tetrahydrate and tetra-n-butyl titanate added were changed to such amounts that would provide a phosphorus atom content P of 0.387 mols/ton of resin, a magnesium atom content M of 0.123 mols/ton of resin and a titanium atom content T of 0.063 mols per ton of resin, respectively, and that no supplemental addition of ethylene glycol was made, to produce a polyethylene terephthalate resin C and performs using it. The titanium atom content T (mols/ton of resin), magnesium atom content M (mols/ton of resin) and phosphorus atom content P (mols/ton of resin) of the obtained polyethylene terephthalate resin C were determined, and the values of M/P and M/T were calculated therefrom, obtaining the results shown in Table 2. The acetaldehyde content ($AA_0$, $AA_1$, $AA_2$) and cyclic trimer content ($CT_0$, $CT_1$, $CT_2$) were also determined with the results shown in Table 2.

Comparative Example 2

To an esterification reator to which about 60 parts by weight of bis(hydroxyethyl)terephthalate resin had been fed in advance and which was kept at 250° C. and $1.2 \times 10^5$ Pa in relative pressure, a slurry of 43 parts by weight of terephthalic acid and 19 parts by weight of ethylene glycol was supplied over a period of 4 hours to carry out an esterification reaction. Even after the supply ended, the esterification reaction was continued for one hour. About half of the reaction product was transferred to a polycondensation reactor, and through a pipe connected thereof, ethyl acid phosphate was added as an ethylene glycol solution in such an amount that the content P of the phosphate calculated as phosphorus atoms would become 0.969 mols per ton of the obtained polyethylene terephthalate resin. Five minutes later, germanium dioxide was added in such an amount that the content G of the germanium compound calculated as germanium atoms would become 0.551 mols per ton of the obtained polyethylene terephthalate resin, after which the temperature in the system was raised from 250 to 280° C. over a period of 2.5 hours while pressure was reduced from normal pressure to $4 \times 10^2$ Pa in one hour. With this pressure maintained, the melt polycondensation reaction was continued until the produced resin came to have an intrinsic viscosity ($[\eta_1]$) of 0.55 dl/g, and then the product was discharged out in the form of strand from the discharge port provided at the bottom of the polycondensation reactor and made into pellets in the same way as in Example 1.

The thus obtained melt polycondensed resin pellets were supplied continuously into a stirring crystallization machine maintained at about 160° C. so that the residence time would become about 5 minutes, and the crystallized resin pellets were dried in an inert oven (Espec's IPHH-201) in a 40 L/min nitrogen gas stream at 160° C. for 2 hours and then heated at 210° C. for a period enough for the resin to have an intrinsic viscosity ($[\eta_2]$) of 0.75 dl/g, thus carrying out a solid-phase polycondensation reaction to produce a polyethylene terephthalate resin D. Preforms were also produced in the same way as in Example 1. The germanium atom content G (mols/ton of resin) and phosphorus atom content P (mols/ton of resin) of this polyethylene terephthalate resin D were determined with the results shown in Table 2. The acetaldehyde content ($AA_0$, $AA_1$, $AA_2$) and cyclic trimer content ($CT_0$, $CT_1$, $CT_2$) were also determined to obtain the results shown in Table 2.

Comparative Example 3

5 kg of the polyethylene terephthalate resin D obtained in Comparative Example 2 was immersed in 6.5 kg of distilled water in a stainless steel container and heated for 4 hours with the internal temperature controlled at 90° C. to conduct a water treatment. The resulting product was dehydrated and then dried by heating in an inert oven (Espec's IPHH-201) at 140° C. for 14 hours in a stream of nitrogen to obtain a polyethylene terephthalate resin D'. Preforms were produced using this resin in the same way as in Example 1. The acetaldehyde content ($AA_0$, $AA_1$, $AA_2$) and cyclic trimer content ($CT_0$, $CT_1$, $CT_2$) of the obtained polyethylene terephthalate resin D' were determined, with the results shown in Table 2.

Comparative Example 4

The same procedure as defined in Example 1 was conducted except that no supplemental addition of ethylene glycol through an upper pipe of the 2nd-stage esterification reactor was made to produce a polyethylene terephthalate resin E and its preforms. The content T (mols/ton of resin) of titanium atoms, content M (mols/ton of resin) of magnesium atoms and content P (mols/ton of resin) of phosphorus atoms of the obtained polyethylene terephthalate resin E were determined, from which M/P and M/T were computed to obtain the results shown in Table 2. Also, the acetaldehyde content ($AA_0$, $AA_1$, $AA_2$) and cyclic trimer content ($CT_0$, $CT_1$, $CT_2$) of the resin E were determined with the results shown in Table 2.

TABLE 2

| | Example 1 | Example 2 | Comp. Example 1 |
|---|---|---|---|
| Polyester resin | | | |
| Resin | A | B | C |
| Amount of supplemental addition of ethylene glycol (parts by weight/hr) | 30 | 30 | 0 |
| Titanium atom content (T) (mols/ton) | 0.084 | 0.084 | 0.063 |
| Magnesium atom content (M) (mols/ton) | 0.165 | 0.247 | 0.123 |
| Calcium atom content (C) (mols/ton) | — | 0.250 | — |
| Germanium atom content (G) (mols/ton) | — | — | — |
| Phosphorus atom content (P) (mols/ton) | 0.129 | 0.194 | 0.387 |
| M/P (mols/mols) | 1.28 | 1.27 | 0.32 |
| M/T (mols/mols) | 1.96 | 2.94 | 1.95 |
| C/P (mols/mols) | — | 1.29 | — |
| C/T (mols/mols) | — | 2.98 | — |
| Intrinsic viscosity [$\eta_2$] (dl/g) | 0.80 | 0.80 | 0.80 |
| Acetaldehyde content ($AA_0$) (ppm) | 2.4 | 2.5 | 2.5 |
| Cyclic trimer content ($CT_0$) (wt %) | 0.32 | 0.32 | 0.34 |
| Terminal carboxyl groups (equivalents/ton of resin) | 16 | 16 | — |
| Product | | | |
| Acetaldehyde content ($AA_1$) (ppm) | 19 | 21 | 18 |
| Molded Acetaldehyde content ($AA_2$) (ppm) | 11 | 10 | 14 |
| [($AA_1 - AA_2$)/$AA_1$] × 100 (%) | 42 | 52 | 22 |
| Cyclic trimer content ($CT_1$) (wt %) | 0.44 | 0.43 | 0.47 |
| Cyclic trimer content ($CT_2$) (wt %) | 0.36 | 0.35 | 0.43 |
| $CT_1 - CT_2$ (wt %) | 0.08 | 0.08 | 0.04 |

| | Comp. Example 2 | Comp. Example 3 | Comp. Example 4 |
|---|---|---|---|
| Polyester resin | | | |
| Resin | D | D' | E |
| Amount of supplemental addition of ethylene glycol (parts by weight/hr) | — | — | 0 |
| Titanium atom content (T) (mols/ton) | — | — | 0.084 |
| Magnesium atom content (M) (mols/ton) | — | — | 0.165 |
| Calcium atom content (C) (mols/ton) | — | — | — |
| Germanium atom content (G) (mols/ton) | 0.551 | 0.551 | — |
| Phosphorus atom content (P) (mols/ton) | 0.969 | 0.969 | 0.129 |
| M/P (mols/mols) | — | — | 1.28 |
| M/T (mols/mols) | — | — | 1.96 |
| C/P (mols/mols) | — | — | — |
| C/T (mols/mols) | — | — | — |
| Intrinsic viscosity [$\eta_2$] (dl/g) | 0.75 | 0.75 | 0.80 |
| Acetaldehyde content ($AA_0$) (ppm) | 2.4 | 2.7 | 2.6 |
| Cyclic trimer content ($CT_0$) (wt %) | 0.32 | 0.32 | 0.55 |
| Terminal carboxyl groups (equivalents/ton of resin) | — | — | 23 |
| Product | | | |
| Acetaldehyde content ($AA_1$) (ppm) | 20 | 17 | 19 |
| Molded Acetaldehyde content ($AA_2$) (ppm) | 15 | 13 | 14 |
| [($AA_1 - AA_2$)/$AA_1$] × 100 (%) | 25 | 24 | 26 |
| Cyclic trimer content ($CT_1$) (wt %) | 0.40 | 0.34 | 0.60 |
| Cyclic trimer content ($CT_2$) (wt %) | 0.36 | 0.33 | 0.56 |
| $CT_1 - CT_2$ (wt %) | 0.04 | 0.01 | 0.04 |

Example 3

The polyethylene terephthalate resin B obtained in Example 2 (moisture content in the undried state: 2,000 ppm) was dried in a tray type vacuum dryer (Yamato Science's DP-63) under the conditions of 145° C. and 10 Torr for 15 hours to a moisture content of 20 ppm. 95 parts by weight of this dried resin (temperature: 120° C.) was mixed with 5 parts by weight of the undried resin to form a mixed resin with a weighted mean moisture content of 120 ppm, and this mixed resin was injection molded into preforms under the same conditions as adopted in Example 1. The intrinsic viscosity, acetaldehyde content and cyclic trimer content of a sample of the obtained preforms were determined. Results are shown in Table 3.

Example 4

The polyethylene terephthalate resin B obtained in Example 2 (moisture content in the undried state: 2,000 ppm) was dried in a tray type vacuum dryer (Yamato Science's DP-63) under the conditions of 145° C. and 10 Torr for 15 hours to a moisture content of 20 ppm. 99 parts by weight of this dried resin (temperature: 120° C.) was mixed with one part by weight of a polyethylene terephthalate resin (moisture content: 10,000 ppm) having mixed therewith 25% by weight of a polyamide MXD6 comprising metaxylylenediamine and adipic acid to form a mixed resin having a weighted mean moisture content of 120 ppm, and this mixed resin was injection molded into preforms in the same way as in Example 1. The intrinsic viscosity, acetaldehyde content and cyclic trimer content of a sample of the obtained preforms were determined, the results of which are shown in Table 3.

Example 5

The polyethylene terephthalate resin B obtained in Example 2 (moisture content in the undried state: 2,000 ppm) was dried in a tray type vacuum dryer (Yamato Science's DP-63) under the conditions of 145° C. and 10 Torr for 15 hours to a moisture content of 20 ppm. This dried resin was charged into a hopper dryer (Kawata MFG's Challenger D-50T; dew point of dehumidified air=−30° C.; air flow=50 m³/hr; setting temperature=130° C.) on the molding machine and supplied to the molding machine. A thermocouple and a microsyringe (mfd. by Hamilton Company) were set at the joint of the molding machine and the hopper, whereby measurement of resin pellet temperature and injection of water were conducted. The resin pellet temperature measured by a thermometer using the said thermocouple was 120° C. By using the set microsyringe, 20 μl of water was injected when the screw of the injection molding machine was in operation for metering the resin. The amount of water injected was 20 μl/66 g of the resin applied to one molding cycle. Injection frequency was once per one molding cycle. The moisture content of the resin was computed to be 323 ppm by weight. Preforms were injection molded from this resin in the same way as in Example 1. The whole body portion of the obtained preforms was transparent. The intrinsic viscosity, acetaldehyde content and cyclic trimer content of a sample of the obtained preforms were determined, the results being shown in Table 3.

Referential Example 1

The polyethylene terephthalate resin B obtained in Example 2 (moisture content in the undried state: 2,000 ppm) was dried in a tray type vacuum dryer (Yamato Science's DP-63) under the conditions of 145° C. and 10 Torr for 15 hours to a moisture content of 20 ppm. By using this dried resin alone, preforms were injection molded under the same conditions as in Example 1. The intrinsic viscosity, acetaldehyde content and cyclic trimer content of a sample of the obtained preforms were determined, the results being shown in Table 3.

Referential Example 2

The polyethylene terephthalate resin B obtained in Example 2 (moisture content in the undried state: 2,000 ppm) was dried in a tray type vacuum dryer (Yamato Science's DP-63) under the conditions of 145° C. and 10 Torr for 15 hours to a moisture content of 20 ppm. 73 parts by weight of this dried resin (temperature: 120° C.) and 27 parts by weight of the undried resin were mixed to form a mixed resin having a weighted mean moisture content of 560 ppm, and preforms were injection molded from this mixed resin under the same conditions as in Example 1. The intrinsic viscosity, acetaldehyde content and cyclic trimer content of a sample of the obtained preforms were determined, the results being shown in Table 3.

Referential Example 3

A mixed resin was obtained in the same way as in Example 4 except that in place of the polyethylene terephthalate resin (moisture content: 10,000 ppm) having mixed therewith 25% by weight of a polyamide MXD6 comprising metaxylenediamine and adipc acid, there was used a dried resin obtained by drying the said polyethylene terephthalate resin in a tray type vacuum dryer (Yamato Science's DP-63) under the conditions of 145° C. and 10 Torr for 15 hours to a moisture content of 20 ppm. This mixed resin was injection molded into preforms under the same conditions as in Example 1, and the intrinsic viscosity, acetaldehyde content and cyclic trimer content of a sample of the obtained preforms were determined, the results being shown in Table 3.

TABLE 3

|  | Example 3 | Example 4 | Example 5 |
|---|---|---|---|
| Molding material |  |  |  |
| Resin | B mixture | B/PET mixture | B single |
| Moisture content (ppm) | 120 | 120 | 20 |
| Amount of water added (μl/66 g) | 0 | 0 | 20 |
| Resin temperature at addition of water (° C.) | — | — | 120 |
| Molded product |  |  |  |
| Intrinsic viscosity (dl/g) | 0.70 | 0.70 | 0.70 |
| Intrinsic viscosity retention rate (%) | 88 | 88 | 88 |
| Acetaldehyde content (ppm) | 10 | 9 | 10 |
| Cyclic trimer content (wt %) | 0.35 | 0.34 | 0.34 |

|  | Reference Example 1 | Reference Example 2 | Reference Example 3 |
|---|---|---|---|
| Molding material |  |  |  |
| Resin | B single | B mixture | B/PET mixture |
| Moisture content (ppm) | 20 | 560 | 20 |
| Amount of water added (μl/66 g) | 0 | 0 | 0 |
| Resin temperature at addition of water (° C.) | — | — | — |
| Molded product |  |  |  |
| Intrinsic viscosity (dl/g) | 0.75 | 0.61 | 0.75 |
| Intrinsic viscosity retention rate (%) | 94 | 76 | 94 |
| Acetaldehyde content (ppm) | 21 | 8 | 17 |
| Cyclic trimer content (wt %) | 0.43 | 0.33 | 0.45 |

Comparative Example 5

The polyethylene terephthalate resin D obtained in Comparative Example 2 (moisture content in the undried state:

2,000 ppm) was dried in a tray type vacuum dryer (Yamato Science's DP-63) under the conditions of 145° C. and 10 Torr for 15 hours to a moisture content of 20 ppm. 95 parts by weight of this dried resin (temperature: 120° C.) was mixed with 5 parts by weight of the undried resin to form a mixed resin having a weighted mean moisture content of 120 ppm, and preforms were injection molded from this mixed resin under the same conditions as in Example 1. Intrinsic viscosity, acetaldehyde content and cyclic trimer content of a sample of these preforms were determined, the results being shown in Table 4.

Comparative Example 6

The polyethylene terephthalate resin C obtained in Comparative Example 1 (moisture content in the undried state: 2,000 ppm) was dried in a tray type vacuum dryer (Yamato Science's DP-63) under the conditions of 145° C. and 10 Torr for 15 hours to a moisture content of 20 ppm. 92 parts by weight of this dried resin (temperature: 120° C.) and 8 parts by weight of the undried resin were mixed to form a mixed resin having a weighted mean moisture content of 180 ppm. This mixed resin was injection molded into preforms under the same conditions as defined in Example 1, and the intrinsic viscosity, acetaldehyde content and cyclic trimer content of a sample of the preforms were determined. Results are shown in Table 4.

Comparative Example 7

The polyethylene terephthalate resin D' obtained in Comparative Example 3 (moisture content in the undried state: 2,000 ppm) was dried in a tray type vacuum dryer (Yamato Science's DP-63) under the conditions of 145° C. and 10 Torr for 15 hours to a moisture content of 20 ppm. 95 parts by weight of this dried resin (temperature: 120° C.) and 5 parts by weight of the undried resin were mixed to form a mixed resin having a weighted mean moisture content of 120 ppm. This mixed resin was injection molded into preforms under the same conditions as used in Example 1, and their sample's intrinsic viscosity, acetaldehyde content and cyclic trimer content were determined. Results are shown in Table 4.

Comparative Example 8

The polyethylene terephthalate resin B obtained in Example 2 (moisture content in the undried state: 2,000 ppm) was dried in a tray type vacuum dryer (Yamato Science's DP-63) under the conditions of 180° C. and 10 Torr for 15 hours to a moisture content of 20 ppm. This dried resin was charged into a hopper dryer (Kawata MFG's Challenger D-50T; dew point of dehumidified air=-30° C.; air flow=50 m³/hr; setting temperature=185° C.) on the molding machine and supplied into the molding machine for injection molding preforms in the same way as in Example 5. In this operation, the resin pellet temperature measured by a thermometer using a thermocouple was 170° C. The whole body portion of the obtained preforms was transparent. Intrinsic viscosity, acetaldehyde content and cyclic trimer content of a sample of the obtained preforms were determined, the results being shown in Table 4.

Comparative Example 9

The polyethylene terephthalate resin B dried in the same way as in Example 5 was kept under the conditions of 40° C. and 10 Torr for 24 hours to lower the resin pellet temperature to 40° C. while maintaining the pellets in the dry state. This dried resin was injection molded into preforms in the same way as in Example 5 except that the resin was charged into the hopper dryer set at 40° C. and supplied to the molding machine. In the resin mixing operation, the resin pellet temperature measured by a thermometer using a thermocouple was 40° C. The body portion of the obtained preforms had white streaks throughout and was poor in transparency. Intrinsic viscosity, acetaldehyde content and cyclic trimer content of a sample of the obtained preforms were determined, the results being shown in Table 4.

TABLE 4

|  | Comparative Examples | | | | |
| --- | --- | --- | --- | --- | --- |
|  | 5 | 6 | 7 | 8 | 9 |
| Molding material |  |  |  |  |  |
| Resin | D mixture | C mixture | D' mixture | B single | B single |
| Moisture content (ppm) | 120 | 180 | 120 | 20 | 20 |
| Amount of water added (μl/66 g) | 0 | 0 | 0 | 20 | 20 |
| Resin temperature at addition of water (° C.) | — | — | — | 180 | 40 |
| Molded product |  |  |  |  |  |
| Intrinsic viscosity (dl/g) | 0.66 | 0.63 | 0.66 | 0.73 | 0.63 |
| Intrinsic viscosity retention rate (%) | 88 | 84 | 88 | 91 | 79 |
| Acetaldehyde content (ppm) | 15 | 13 | 13 | 18 | 11 |
| Cyclic trimer content (wt %) | 0.36 | 0.35 | 0.35 | 0.37 | 0.33 |

Example 6

The polyethylene terephthalate resin B obtained in Example 2 (moisture content in the undried state: 2,000 ppm) was charged into and dried in a dehumidifying hopper dryer (Kawata MFG's Challenger D-50T; dew point of dehumidified air=-30° C.; air flow=50 m³/hr) set on an injection molding machine (Nissei ASB Machine's ABS50TH). In this operation, the drying temperature was set at 150° C., and the residence time in the dryer of the polyethylene terephthalaate resin B was adjusted so that the drying time would become 4 hours. Moisture content of the dried resin was 30 ppm. From the joint between the injection molding machine and the dryer, the undried polyethylene terephthalate resin B (moisture content=2,000 ppm) was added in an amount of 3.3 g once every molding cycle (33 seconds) (so as to make a mixture of 95 parts by weight of the dried resin and 5 parts by weight of the undried resin) to form a mixed resin with a weighted mean moisture content of 129 ppm. The resin pellet temperature measured by a thermometer using a thermocouple was 140° C. Using this mixed resin, the prrforms were injection molded continuously for 12 hours under the same conditions as in Example 1. The molding operation was here interrupted for 2 hours and then again carried out continuously for 12 hours. The acetaldehyde content of the obtained preforms was measured every three hours after start of the molding operation. Results are shown in Table 5. As a result of the 24-hour continuous molding operation with 2-hour interruption for cleaning the mold in its course, the acetaldehyde content in the molded preforms was low, with the deviation limited, and it was thus possible to obtain the molded products with stabilized quality.

Example 7

Drying of the resin and molding of the preforms were conducted in the same way as in Example 6 except that instead of mixing the undried polyethylene terephthalate resin B, 30 μl of water was injected by a microsyringe (mfd. by Hamilton Company) set at the joint between the injection molding machine and the dryer when the screw of the molding machine was being operated for metering the resin. The amount of water added was 30 μl/66 g of the resin offered to one molding cycle and injection frequency was once every molding cycle, so that the moisture content of the resin was calculated to be 485 ppm by weight. The acetaldehyde content in the obtained preforms was determined in the same way as in Example 6, the results being shown in Table 5. The acetaldehyde content in the preforms was low, with the deviation limited, and it was possible to obtain the molded products with stabilized quality.

Referential Example 4

Drying of the resin was carried out in the same way as in Example 6 except that the drying temperature in the dehumidifying dryer was set at 130° C. and the residence time of the polyethylene terephthalate resin B in the dryer was adjusted so that the drying time required would become 3 hours. The moisture content of the dried resin was 120 ppm. This resin was molded into preforms in the same way as in Example 6, and the acetaldehyde content of a sample of the obtained preforms was determined, with the results shown in Table 5. The acetaldelhyde content was low immediately after start of molding, and although it once increased 3 hours later, it returned to the low level 6 and 12 hours later. There was observed a pattern of variation of acetaldehyde content in which it once increases immediately after resumption of molding after interruption for cleaning the mold but it returns to the low level with the lapse of time. Thus there was a period when the acetaldehyde content heightens after start of molding.

TABLE 5

| | Molding method*) | | |
|---|---|---|---|
| | Example 6 | Example 7 | Reference Example 4 |
| Resin used | B mixture | B single | B single |
| Moisture content of dried resin at start of molding | 30 ppm | 30 ppm | 120 ppm |
| Moisture content of added resin | 2000 ppm | — | — |
| Weighted mean moisture content | 129 ppm | — | — |
| Amount of water added | — | 30 μl/66 g (of PET) | — |
| Intrinsic viscosity of molded product (dl/g) | 0.70 | 0.70 | 0.70 |
| Start Acetaldehyde content of molded product (ppm) | | | |
| Start | 10 | 12 | 10 |
| 3 hr. later | 12 | 10 | 16 |
| 6 hr. later | 11 | 11 | 11 |
| 12 hr. later | 11 | 12 | 12 |
| (After stoppage of molding for cleaning the mold) | | | |
| 3 hr. | 12 | 11 | 15 |
| 6 hr. | 11 | 11 | 14 |
| 12 hr. | 11 | 10 | 12 |
| Average | 11.1 | 11.0 | 12.9 |
| Deviation | 0.6 | 0.8 | 2.0 |
| Maximum | 12 | 12 | 16 |
| Minimum | 10 | 10 | 10 |
| Yield (ratio of the molded products with acetaldehyde content not more than 12 ppm) (%) | 100 | 100 | 63 |

*)Example 6: (Moisture adjustment by mixing resins with different moisture contents)
Example 7: Moisture adjustment by addition of water
Reference Example 4: (Moisture adjustment by drying conditions)

What is claimed is:

1. A process for producing a molded polyester resin article which process comprises molding a polyethylene terephthalate resin comprising uses, as starting material, a polyester resin mixture (c) with its moisture content adjusted to 60 to 300 ppm by weight, said mixture comprising, a polyester resin (a) having a moisture content of less than 60 ppm by weight and a polyester resin (b) other than the polyester resin (a) and having a moisture content of not less than 60 ppm by weight wherein the ratio of the polyester resin (a) to the polyester resin (b) is from >1 to ≦200 by resin weight, wherein the moisture content of the mixture (c) is a value calculated from the weighted means of the moisture content and the amount blended of the polyester resin (a) and the moisture content and the amount blended of the polyester resin (b), and
wherein the article is molded using an injection or extrusion molding machine, wherein a mixture (c) is formed at a point between a material charging hopper attached to the molding machine and a material feeding section of a screw in the molding machine, and the temperature of the polyester resin (a) offered to the formation of the mixture (c) is not lower than 60° C. and not higher than 170° C.

2. The process according to claim 1, wherein intrinsic viscosity ($IV_0$) of the mixture (c) and intrinsic viscosity ($IV_1$) of the molded product satisfy the following formula:

$$0.75 \leq IV_1/IV_0 \leq 0.95.$$

3. The process according to claim 1, wherein the polyester resin (a) is a polyethylene terephthalate resin having an intrinsic viscosity of not less than 0.70 dl/g and not more than 1.50 dl/g and an acetaldehyde content of not more than 10 ppm by weight, and the polyester resin (a) has such properties that the acetaldehyde content [$AA_1$ (ppm by weight)] of the molded product obtained by injection molding the resin at 280° C. with its moisture content adjusted to 30±20 ppm by weight and the acetaldehyde content [$AA_2$ (ppm by weight)] of the molded product obtained by injection molding the resin at 280° C. with its moisture content adjusted to 120±20 ppm by weight satisfy the following formula (I):

$$[AA_1-AA_2/AA_1]\times100 \geq 30 \qquad (1).$$

* * * * *